United States Patent
Moriya et al.

(10) Patent No.: US 6,630,804 B2
(45) Date of Patent: Oct. 7, 2003

(54) DRIVING APPARATUS, POWER OUTPUT APPARATUS, AND CONTROL METHOD

(75) Inventors: Kazunari Moriya, Aichi-ken (JP); Yukio Inaguma, Aichi-ken (JP); Hideo Nakai, Aichi-ken (JP); Hiroki Ohtani, Aichi-ken (JP); Sumikazu Shamoto, Aichi-ken (JP); Masayuki Komatsu, Aichi-ken (JP); Shoichi Sasaki, Aichi-ken (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/987,282

(22) Filed: Nov. 14, 2001

(65) Prior Publication Data

US 2002/0105300 A1 Aug. 8, 2002

(30) Foreign Application Priority Data

Nov. 14, 2000 (JP) .......................................... 2000-346967
Oct. 29, 2001 (JP) .......................................... 2001-331175

(51) Int. Cl.⁷ .......................... H02M 7/5387; H02J 3/00
(52) U.S. Cl. ........................ 318/85; 318/106; 318/437; 318/440
(58) Field of Search .............................. 318/41, 42, 49, 318/66, 85, 105, 106, 107, 437, 440, 441, 442, 722, 724

(56) References Cited

U.S. PATENT DOCUMENTS

| | | | |
|---|---|---|---|
| 4,641,066 A | * 2/1987 | Nagata et al. .............. | 318/254 |
| 5,099,186 A | 3/1992 | Rippel et al. ............... | 318/803 |
| 5,389,749 A | 2/1995 | Hokari et al. | |
| 5,748,459 A | * 5/1998 | Yamada et al. ............. | 363/21 |
| 6,008,616 A | * 12/1999 | Nagayama et al. ......... | 318/773 |
| 6,066,928 A | 5/2000 | Kinoshita et al. | |
| 6,090,231 A | 7/2000 | Saito | |

FOREIGN PATENT DOCUMENTS

| | | |
|---|---|---|
| EP | 0866544 A2 | 9/1998 |
| EP | 19823917 | 12/1998 |
| JP | 60066655 | 4/1985 |
| JP | 1055076 | 3/1989 |
| JP | 4-295202 | 10/1992 |
| JP | 10-337047 | 12/1998 |
| JP | 11-178114 | 7/1999 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

A direct-current power supply (40) is connected between the neutral points of two three-phase coils (24, 26) of a 2Y motor (22) constituted of the windings of the two three-phase coils (24, 26), which are connected in Y-connection and wound on a same stator, and to which three-phase alternating current power is severally supplied with a phase difference of a shifted angle between the windings from two inverter circuits (30, 32) having a positive pole bus (34) and a negative pole bus (36) for common use. A capacitor (38) is connected between the positive pole bus (34) and the negative pole bus (36). The electric potential difference between the neutral points of the three-phase coils (24, 26) is made larger or smaller than the voltage of the direct-current power supply (40) through the switching control of the inverter circuits (30, 32). Thereby, the capacitor (38) can be charged or discharged. Consequently, an inverter input voltage can be adjusted within a wide range.

18 Claims, 28 Drawing Sheets

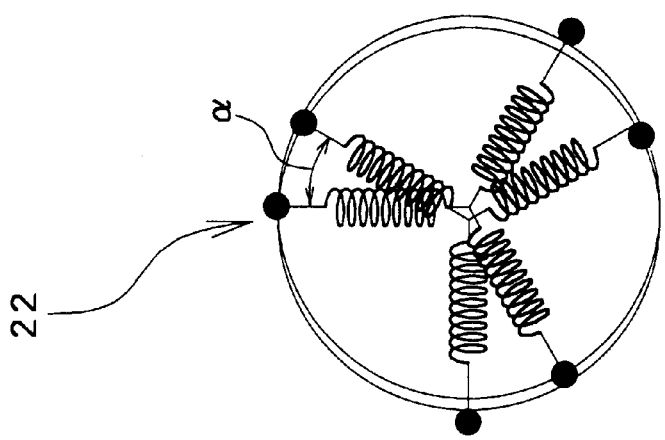
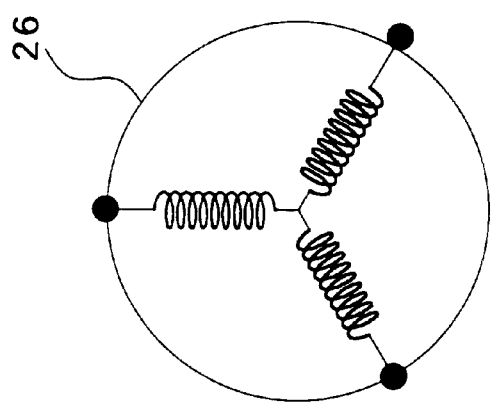
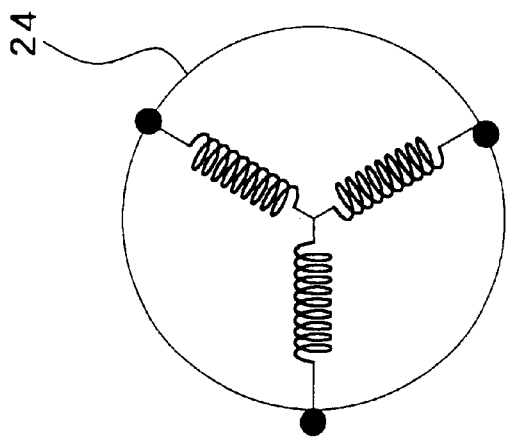
FIG. 2

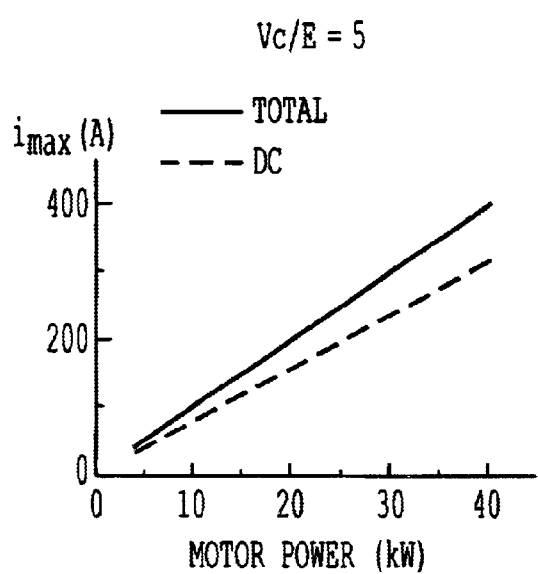
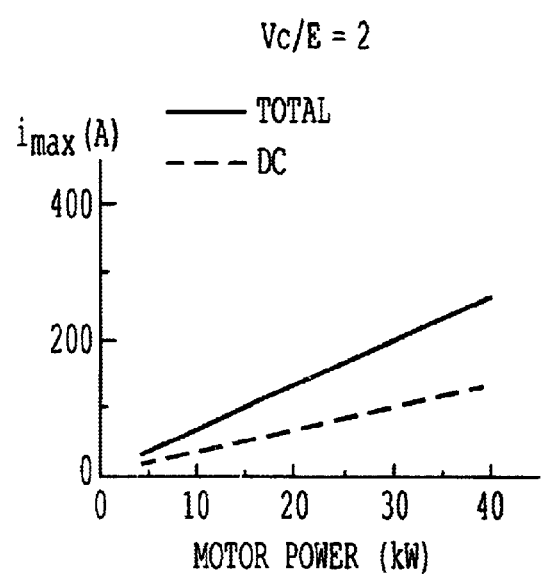
*FIG. 18A*  *FIG. 18B*

DRIVING APPARATUS, POWER OUTPUT APPARATUS, AND CONTROL METHOD

BACKGROUND OF THE INVENTION

1. Field of the Invention

The present invention relates to a driving apparatus, a power output apparatus, and to a control method applicable to these apparatuses.

2. Description of the Related Art

A power output apparatus provided with a capacitor connected between a positive pole bus and a negative pole bus of an inverter circuit for applying a three-phase alternating current to an electric motor and a direct-current power supply connected between the positive pole bus or the negative pole bus of the inverter circuit and a neutral point of an electric motor has been proposed in, for example, Japanese Laid-Open Patent Publications No. Hei 10-337047 and Hei 11-178114. All these publications require that the apparatus have the functions of charging the capacitor and driving the electric motor by realizing, by time shearing, the operation of making a circuit composed of coils in each phase of the electric motor and switching devices of the inverter circuit function as a booster chopper circuit for boosting the voltage of the direct-current power supply to charge the capacitor and the operation of making the inverter circuit function as an original circuit for driving the electric motor by the use of the capacitor voltage.

However, in such a power outputting apparatuses, it is necessary to limit the voltage input to the inverter circuit, i.e. the voltage between the terminals of the capacitor, to a voltage within a range from the voltage of the direct-current power supply to about three times the voltage of the power supply when the difference between the voltage of the positive and the negative buses viewed from the neutral point of the electric motor is considered. The electric motor can effectively be driven if the input voltage to the inverter circuit can be controlled according to the state of the electric motor. However, driving efficiency of the electric motor is limited when the range of the input voltage is limited.

SUMMARY OF THE INVENTION

A driving apparatus, a power output apparatus, and their control method all have an object of controlling an input voltage to their inverter circuits over a wide range. Moreover, the driving apparatus, the power output apparatus, and the control method also aim to more efficiently drive the electric motor.

In the driving apparatus of the present invention, an input voltage of its inverter circuit is determined by the neutral point electric potential of each winding group to which a secondary power supply of the driving apparatus is connected, while the neutral point electric potential of a winding group which is a load of a polyphase alternating current and to which the inverter circuit is connected can be varied by the inverter circuit. The neutral point electric potential of a winding group which is a load of a polyphase alternating current and to which the inverter circuit is not connected can also be varied by neutral point electric potential control means. The input voltage of the inverter circuit can thereby be freely set regardless of the voltage of the secondary power supply.

In such a driving apparatus of the present invention, the neutral point electric potential control means may be means including an inverter circuit connected with a load of a polyphase alternating current according to the control.

Moreover, in a driving apparatus of the present invention, the load of the plural loads of the polyphase alternating current may be loads equipped by a single electrical apparatus or loads equipped by a plurality of electrical apparatuses.

Moreover, in a power output apparatus of the present invention, by control of two inverter circuits using common positive and negative pole buses, electric power is transferred between a first power supply connected between the positive pole bus and the negative pole bus and a second power supply connected between the neutral points of two star connection coils of an electric motor and polyphase alternating current electric power is supplied to the two star connection coils. Consequently, the voltage between the positive pole bus and the negative pole bus can be controlled over a wide range, and the current to be supplied to the two star connection coils can be controlled. Consequently, the difference in electric potential between the positive pole bus and the negative pole bus, i.e. an input voltage into the two inverter circuits, can be controlled, and the electric motor can therefore be driven more efficiently.

In a first power output apparatus of the present invention, accumulating means capable of being charged and discharged may be used as the first power supply. Accumulating means with a small capacity may be used because the voltage between the terminals of the accumulating means can be controlled.

Moreover, it is preferable to control the voltage of the first power supply by separately controlling percentage modulations, which are ratios of on-periods of the upper side switching devices and the lower side switching devices of the two inverter circuits. In such a case, when the percentage modulation in one of the two inverters is designated d1, the percentage modulation in the other of the two inverters is designated d2, an output voltage of the second power supply is designated Vb, and an output voltage of the first power supply is designated Vc, the percentage modulations in the two inverters can severally be controlled using the formula, $Vc = Vb/(d1-d2)$.

As a result, the voltage values of the first power supply can easily be controlled.

Moreover, when there is dead time when all of the switching devices in a plurality of series connections of the upper side switching devices and the lower side switching devices are turned off, it is preferable that the formula be corrected in consideration of the dead time.

Moreover, it is also preferable to provide the two star connection coils correspondingly to one rotor to constitute an electric motor. In such a case, in order to output a desired torque from the electric motor and so as to maintain target voltages of the first power supply, it is preferable to control the switching of the plural switching devices in the two inverter circuits by making the phase difference between each polyphase alternating current electric power to be supplied to the two star connection coils of the electric motor equal to the phase differences between the two star connection coils.

Moreover, it is also suitable to provide the two star connection coils correspondingly to severally separated rotors and to form two separated motors. In this case, it is preferable to control the switching of the respective plural switching devices in the first inverter circuit and the second inverter circuit so as to output desired torque from the first electric motor and to output desired torque from the second electric motor and so as to hold the voltage of the first power supply to be an object voltage.

Moreover, it is preferable to decrease the maximum value of a current amplitude to be supplied to one of the star connection coils and to add a current corresponding to the decrease amount to a current to be supplied to the other of the star connection coils. Thereby, the maximum value of the current amplitude can be decreased, and the rated voltage and the like of the inverter can be decreased.

Moreover, it is preferable to determine the decreased amount of one of star connection coil and the added amount of the other star connection coil under the condition such that the output torque of the electric motor does not vary. Thereby, influences to the output torque can be eliminated.

Moreover, it is preferable to determine the decreased amount of one of star connection coil and the added amount of the other star connection coil under the condition such that no influences to the current flowing between the neutral points of the two star connection coils occur. Thereby, undesirable effects on the voltage control of the first power supply can be prevented.

It should be understood that, in the power output apparatus, the "electric motor" includes dynamotor capable of generating electrical energy.

BRIEF DESCRIPTION OF THE DRAWINGS

The above and other objects, features and advantages of the present invention will become more apparent from the following description of the preferred exemplary embodiments of the invention taken in conjunction with the accompanying drawings, in which:

FIG. 2 is an explanatory diagram for illustrating the relationship between a three-phase coil 24 and a three-phase coil 26 of a 2Y motor 22;

FIG. 18 is a diagram showing the maximum values of current amplitudes when electric current decreases at the time of being admissible of zero-phase ripples;

DESCRIPTION OF THE PREFERRED EMBODIMENT

Figure 1:
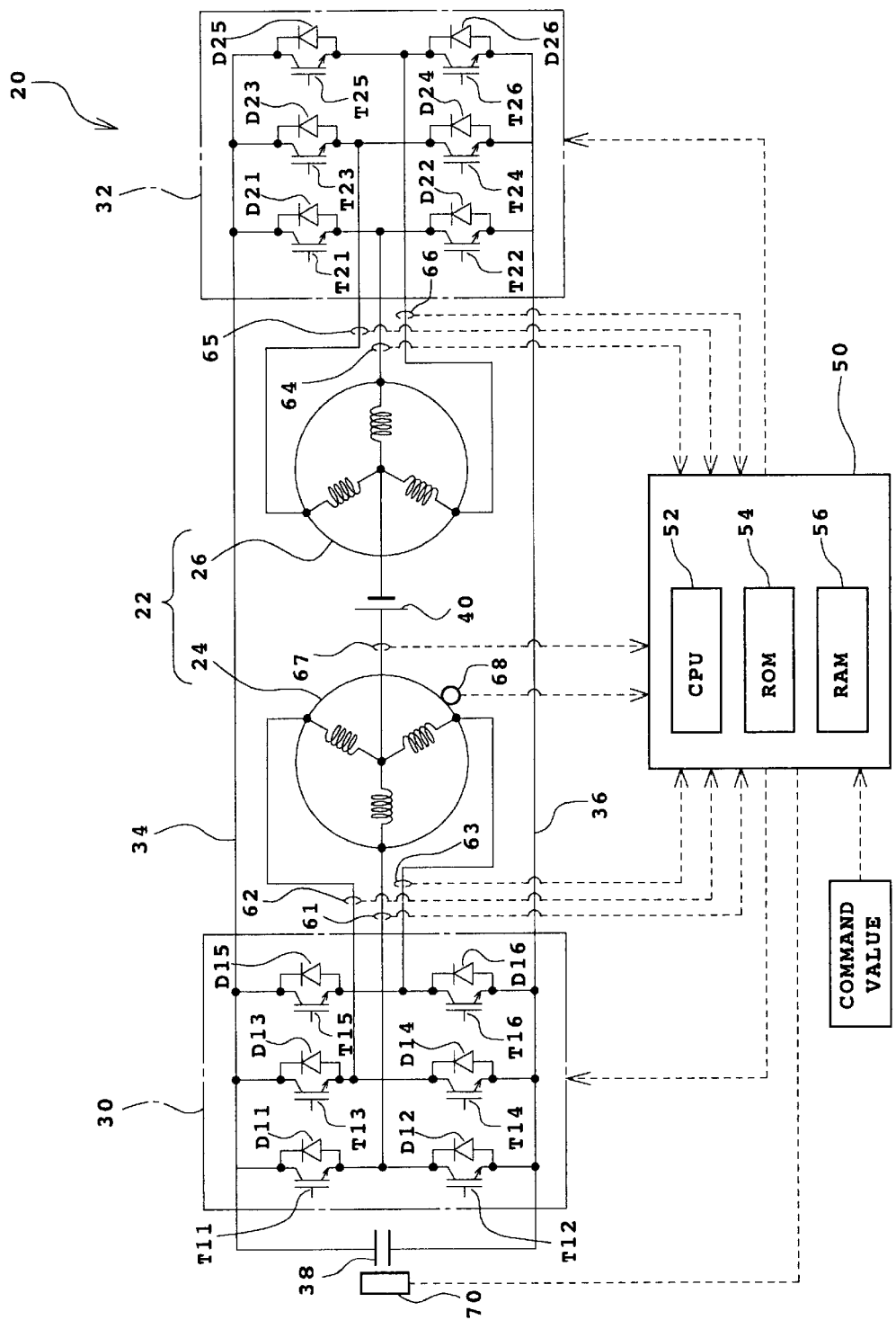
FIG. 1 is a schematic diagram showing the configuration of a power output apparatus 20 being an embodiment of the present invention.

Next, the implementation of the present invention will be described through examples illustrating a preferred embodiment. FIG. 1 is a schematic diagram showing the configuration of a power output apparatus 20 according to an embodiment of the present invention. The power output apparatus 20 of the present embodiment is provided with a double-winding motor (hereinafter referred to as a "2Y motor") including two three-phase coils 24, 26 interconnected in a Y (star) connection; two inverter circuits 30, 32 respectively connected with the two three-phase coils 24, 26, and having a positive pole bus 34 and a negative pole bus 36 for common use; a capacitor 38 connected between the positive pole bus 34 and the negative pole bus 36; a direct-current power supply 40 connected between the neutral points of the two three-phase coils 24, 26 of the 2Y motor 22; and an electronic control unit 50 for controlling the entire apparatus.

FIG. 2 is an explanatory diagram illustrating a relationship between the two three-phase coils 24, 26 of the 2Y motor 22. The 2Y motor 22 is composed of a rotor, on the outer surface of which is, for example, affixed a permanent magnet, and a stator equipped with two three-phase coils 24, 26 that are wound in a state of being shifted by angle α in the rotation direction shown in FIG. 2. The structure of the 2Y motor 22 is the same as that of an ordinal synchronous dynamotor capable of producing electric power except for the fact that the two three-phase coils 24, 26 are wound. Because the three-phase coils 24, 26 are shifted from each other by the angle α in the rotation direction, the 2Y motor 22 can be regarded as a six-phase motor. For the driving of such a 2Y motor 22, the inverter circuit 32 should be driven to apply a three-phase alternating current having a phase difference of a shifted angle α between windings to a three-phase alternating current to be applied to the three-phase coil 24 by the inverter circuit 30 to the three-phase coils 26. The rotation shaft of the 2Y motor 22 is the outputting shaft of the power output apparatus 20 of the embodiment, and power is output from the rotation shaft. Because the 2Y motor of the embodiment is constructed as a dynamotor as described above, electric power can be generated by the 2Y motor 22 as a result of rotation of the rotation shaft of the 2Y motor 22.

The inverter circuits 30, 32 are respectively composed of six transistors T11–T16, T21–T26, and six diodes D11–D16, D21–D26. The six transistors T11–T16, T21–T26 are disposed on the source side and on the sink side between the positive pole bus 34 and the negative pole bus 36 as pairs composed of respective two of them. Each of the three-phase coils 24, 26 (U, V, W) of the 2Y motor 22 is connected with each connection point of the pairs. Accordingly, when the ratios of ON time of the transistors T11–T16, T21–T26 paired in a state such that voltages are applied on the positive pole bus 34 and the negative pole bus 36 are controlled by the phase difference of the shifted angle α between windings, a rotating magnetic field is formed by the three-phase coils 24, 26 of the 2Y motor 22 and thereby the 2Y motor 22 can be driven to rotate.

The electronic control unit 50 is configured as a microprocessor including a central processing unit (CPU) 52 as a main component, and the unit 50 is provided with a read only memory (ROM) 54 storing processing programs, a random access memory (RAM) 56 for storing data temporarily, and an input-output port (not shown). The electronic control unit 50 receives the following inputs through the input port; each phase current Iu1, Iv1, Iw1, Iu2, Iv2, Iw2 from each current sensor 61–66 fitted to each of u-, v- and w-phases of the three-phase coils 24, 26 of the 2Y motor 22; a neutral point current Io from a current sensor 67 fitted to the neutral point of the 2Y motor 22; a rotation angle θ of the rotator of the 2Y motor 22 from the rotation angle sensor 68 fitted to the rotation shaft of the 2Y motor 22; a voltage between the terminals of the capacitor 38 from a voltage sensor 70 fitted to the capacitor 38; command values concerning the driving of the 2Y motor 22; and the like. Any one current sensor in each group of the current sensors 61–63 and 64–66 can be omitted, and any one current sensor in each of the groups may be used as a sensor for detecting abnormality. Moreover, the electronic control unit 50 outputs control signals for performing the switching control of the transistors T11–T16, T21–T26 of the inverter circuits 30, 32 and the like through the output port.

Figure 3A:
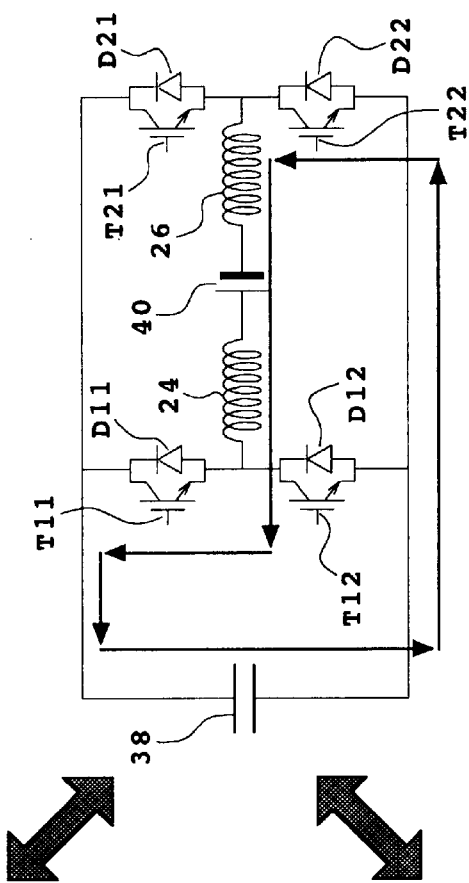
FIGS. 3(a), 3(b) and 3(c) are explanatory diagrams for illustrating current flows when the electric potential difference Vo12 between the neutral point of the three-phase coil 24 and the neutral point of the three-phase coil 26 is smaller than the voltage Vb of a direct-current power supply 40 by referring leakage inductance in the u-phase of the three-phase coils 24, 26 of the 2Y motor 22.
Figure 3B:
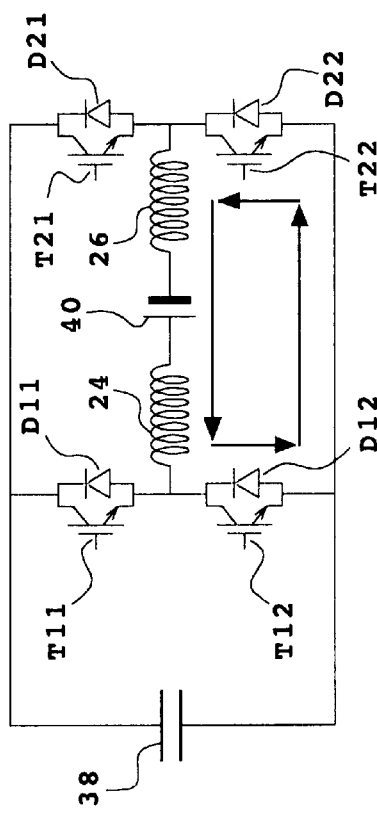
Figure 3C:
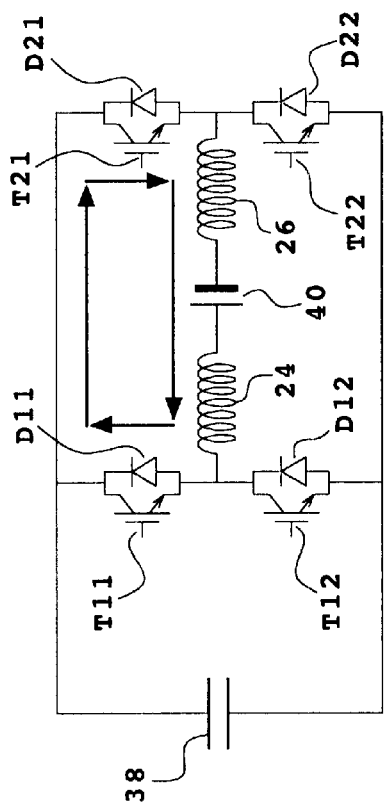

Next, the operation principle of the power output apparatus 20 of the embodiment configured as described above will be described. FIGS. 3(a), 3(b) and 3(c) are explanatory diagrams for illustrating current flows in a state such that the electric potential difference Vo12 between the neutral point of the three-phase coil 24 and the neutral point of the three-phase coil 26 is made smaller than the voltage Vb of the direct-current power supply 40 by referring leakage inductance in the u-phase of the three-phase coils 24, 26 of the 2Y motor 22. In this example, the transistor T12 in the inverter circuit 30 or the transistor T21 in the inverter circuit 32 is turned on in a state such that the electric potential difference Vo12 between the neutral point of the three-phase coil 24 and the neutral point of the three-phase coil 26 is smaller than the voltage Vb of the direct-current power supply 40. In such case, a short circuit shown by an arrow of a continuous line in FIG. 3(a) or FIG. 3(b) is formed, and the u-phase of the three-phase coils 24, 26 of the 2Y motor 22 functions as a reactor. When the transistor T12 in the inverter circuit 30 is turned off and the transistor T21 in the inverter circuit 32 is turned off, the energy stored in the u-phase of the three-phase coils that functions as a reactor is stored in the capacitor 38 by a charging circuit shown by an arrow of a continuous line in FIG. 3(c). Consequently, the circuit can be regarded as a capacitor charging circuit for charging the capacitor 38 with the energy of the direct-current power supply 40. Because the capacitor charging circuit has the same configuration as that of a booster chopper circuit, the voltage Vc between the terminals of the capacitor 38 can be freely operated to be higher than the voltage Vb of the direct-current power supply 40. Because the v-phase and the w-phase of the three-phase coils 24, 26 of the 2Y motor 22 can be regarded as a capacitor charging circuit similarly to the u-phase, the capacitor 38 can be charged by the direct-current power supply 40 by making the electric potential difference Vo12 between the neutral point of the three-phase coil 24 and the neutral point of the three-phase coil 26 be smaller than the voltage Vb of the direct-current power supply 40 and by turning on or off the transistors T12, T14, T16 of the inverter circuit 30 and the transistors T21, T23, T25 of the inverter circuit 32.

Figure 4B:
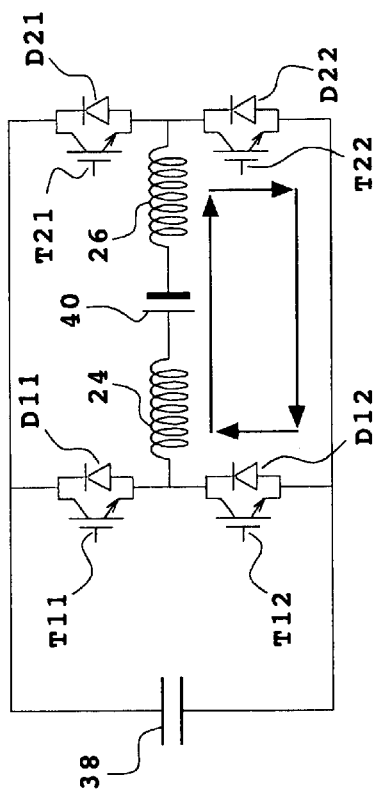
FIGS. 4(a), 4(b) and 4(c) are explanatory diagrams for illustrating current flows when the electric potential difference Vo12 between the neutral point of the three-phase coil 24 and the neutral point of the three-phase coil 26 is larger than the voltage Vb of the direct-current power supply 40 by referring leakage inductance in the u-phase of the three-phase coils 24, 26 of the 2Y motor 22.
Figure 4C:
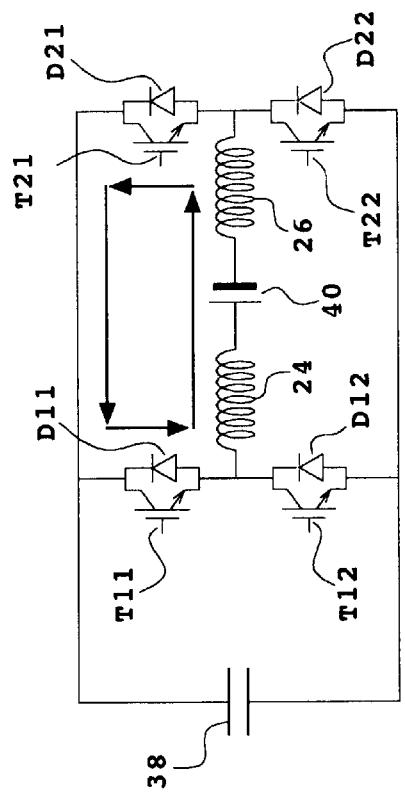
Figure 4A:
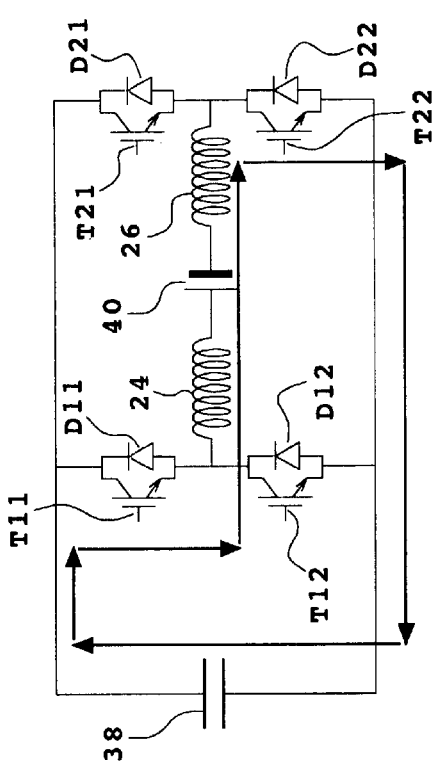

FIGS. 4(a), 4(b) and 4(c) are explanatory diagrams for illustrating current flows in a state such that the electric potential difference Vo12 between the neutral point of the three-phase coil 24 and the neutral point of the three-phase coil 26 is larger than the voltage Vb of the direct-current power supply 40 by referring leakage inductance in the u-phase of the three-phase coils 24, 26 of the 2Y motor 22. In this example, the transistor T11 in the inverter circuit 30 is turned on, the transistor T12 in the inverter circuit 30 and the transistor T21 in the inverter circuit 32 are turned off, and the transistor T22 in the inverter circuit 32 is turned on in a state such that the electric potential difference Vo12 between the neutral point of the three-phase coil 24 and the neutral point of the three-phase coil 26 is larger than the voltage Vb of the direct-current power supply 40. In such a case, a short circuit shown by an arrow of a continuous line in FIG. 4(a) is formed, and the direct-current power supply 40 is charged by the voltage Vc between the terminals of the capacitor 38.

In this case, the u-phase of the three-phase coils 24, 26 of the 2Y motor 22 functions as a reactor as described above. When the transistor T11 in the inverter circuit 30 or the transistor T22 in the inverter circuit 32 are turned off, the energy stored in the u-phase of the three-phase coils that functions as a reactor charges the direct-current power supply 40 through a charging circuit shown by an arrow of a continuous line in FIG. 4(b) or FIG. 4(c). Consequently, the circuit can be regarded as a direct-current power supply charging circuit for charging the energy of the capacitor 38 into the direct-current power supply 40. Because the v-phase and the w-phase of the three-phase coils 24, 26 of the 2Y motor 22 can be regarded as a direct-current power supply charging circuit similarly to the u-phase, the direct-current power supply 40 can be charged by the capacitor 38 by making the electric potential difference Vo12 between the neutral point of the three-phase coil 24 and the neutral point of the three-phase coil 26 larger than the voltage Vb of the direct-current power supply 40 and by turning on or off the transistors T11–T16 of the inverter circuit 30 and the transistors T21–T26 of the inverter circuit 32.

Figure 5A:
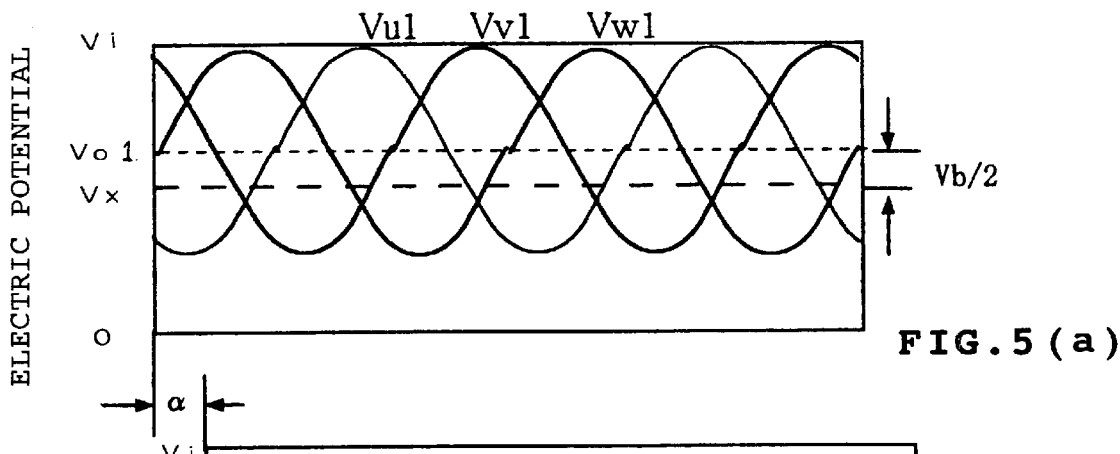
FIGS. 5(a) and 5(b) are explanatory diagrams showing examples of the waveforms of electric potential Vu1, Vv1, Vw1, Vu2, Vv2 and Vw2 of each phase of the three-phase coils 24 and 26 when the difference between the electric potential Vo1 at the neutral point of the three-phase coil 24 and the electric potential Vo2 at the neutral point of the three-phase coil 26 is operated to be equal to the voltage Vb of the direct-current power supply 40.
Figure 5B:
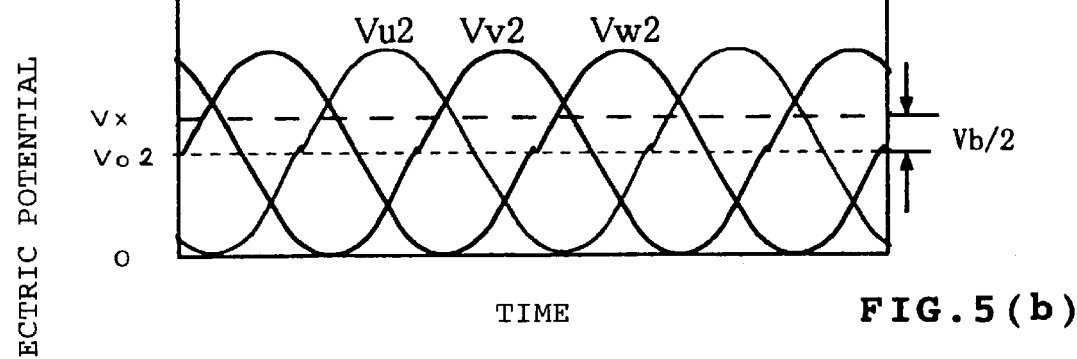

As described above, because the power output apparatus 20 of the embodiment can charge the capacitor 38 with the direct-current power supply 40 and can charge the direct-current power supply 40 with the capacitor 38, the voltage Vc between the terminals of the capacitor 38 can be controlled to be a desired value. When an electric potential difference is generated between the terminals of the capacitor 38, the inverter circuits 30, 32 enter a state such that a direct-current power supply from the capacitor 38 is connected between their positive pole bus 34 and the negative pole bus 36, and the voltage Vc between the terminals of the capacitor 38 operates as an inverter input voltage Vi. Accordingly, through switching control of the transistors T11–T16, T21–T26 of the inverter circuits 30, 32, driving of the 2Y motor 22 can be controlled. In this case, the electric potential Vu1, Vv1, Vw1 of each phase of a three-phase alternating current applied to the three-phase coil 24 can be freely set within the range of the inverter input voltage Vi using the switching control of the transistors T11–T16 in the inverter circuit 30, and the electric potential Vu2, Vv2, Vw2 of each phase of a three-phase alternating current applied to the three-phase coil 26 can be freely set in the range of the inverter input voltage Vi by the switching control of the transistors T21–T26 in the inverter circuit 32. Consequently, the electric potential Vo1 at the neutral point of the three-phase coil 24 of the 2Y motor 22 and the electric potential Vo2 at the neutral point of the three-phase coil 26 of the 2Y motor 22 can be flexibly controlled. FIGS. 5(a) and 5(b) show examples of the waveforms of electric potential Vu1, Vv1, Vw1 (FIG. 5(a)) of each phase of the three-phase coil 24 and the wave forms of electric potential Vu2, Vv2, Vw2 (FIG. 5(b)) of each phase of the three-phase coil 26 when the difference between the electric potential Vo1 at the neutral point of the three-phase coil 24 and the electric potential Vo2 at the neutral point of the three-phase coil 26 is operated to be equal to the voltage Vb of the direct-current power supply 40. In the diagrams, α designates the aforesaid phase difference based on the shifted angle between windings and Vx designates a median (Vi/2) of the inverter input voltage Vi. Accordingly, the voltage of the capacitor 38 can be charged by the operation of the electric potential difference Vo12 between the neutral points of the three-phase coils 24, 26 of the 2Y motor 22 to be lower than the voltage Vb of the direct-current power supply 40, or, contrarily, the direct-current power supply 40 can be charged by the operation of the electric potential difference Vo12 between the neutral points of the three-phase coils 24, 26 to be higher than the voltage Vb of the direct-current power supply 40. The charging current of the capacitor 38 and the charging current of the direct-current power supply 40 can be controlled by the rising and the falling of the electric potential difference Vo12 between the neutral points of the three-phase coils 24, 26.

Figure 6:
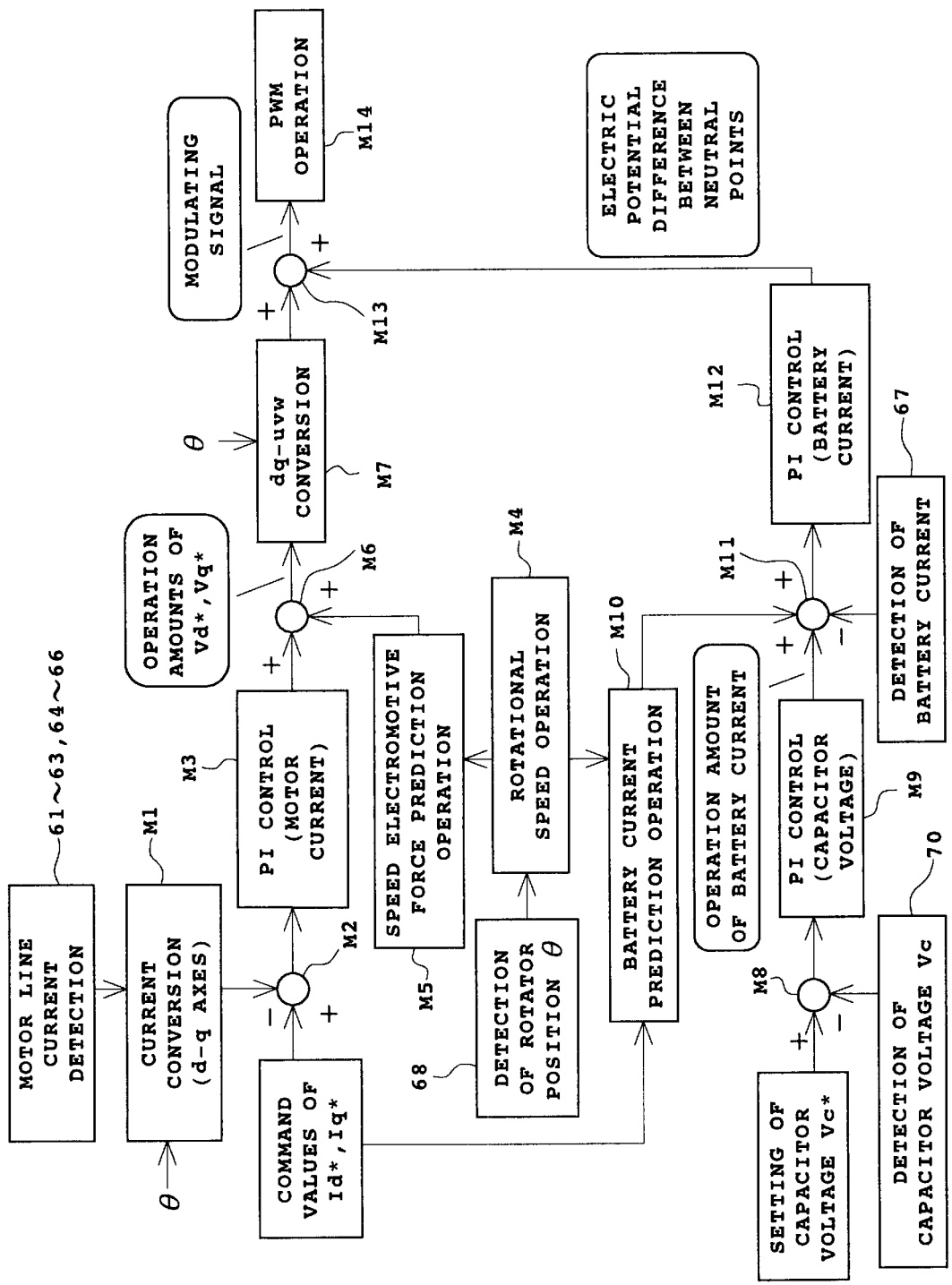
FIG. 6 is a block diagram showing driving control performed in an electronic control unit 50 of the power output apparatus 20.

Next, the driving control of the power output apparatus 20 of the present embodiment will be described. FIG. 6 is a block diagram showing the driving control performed in the electronic control unit 50 of the power output apparatus 20 of the present embodiment as control blocks. As shown in the diagram, the control blocks are composed of a current conversion section M1 for performing the three-phase to two-phase conversion of motor line currents Iu1, Iv1, Iw1, Iu2, Iv2, Iw2 detected by the current sensors 61–63, 64–66 by the use of the rotation angle θ of the rotator of the 2Y motor 22 detected by the rotation angle sensor 68; a subtracter M2 for operating deviations ΔId, ΔIq of current command values Id*, Iq* input as one command value concerning the driving of the 2Y motor 22 from currents Id, Iq after the three-phase to two-phase conversion by the current conversion section M1; a PI control section M3 for operating operation amounts for motor current adjusting to the deviations ΔId, ΔIq by the use of PI gains; speed electromotive force prediction operation section M5 for operating a predicted value of speed electromotive force on the bass of a rotation speed operated by the rotational speed operation section M4 by the use of the rotation angle θ of the rotator of the 2Y motor 22 as detected by the rotation angle sensor 68; an adder M6 for operating voltage operation amounts Vd, Vq by adding the predicted value of the speed electromotive force operated by the speed electromotive force prediction operation section M5 to the operation amounts for motor current adjusting operated by the PI control section M3; a two-phase to three-phase conversion section M7 for performing the two-phase to three-phase conversion of the voltage operation amounts Vd, Vq using the rotation angle θ of the rotator; a subtracter M8 for operating a deviation ΔVc between a capacitor voltage command value Vc* input as one of the command values concerning the driving of the 2Y motor 22 and the voltage Vc detected between the terminals of the capacitor 38 by the voltage sensor 70; a PI control section M9 for operating a battery current operation amount for adjusting capacitor voltage through use of a PI gain to the deviation ΔVc; a battery current prediction operation section M10 for operating a predicted value of a battery current based on a rotation speed operated by the rotation speed operation section M4 and command values Id*, Iq*; an adder-subtracter M11 for adding the predicted value of the battery current operated by the battery current prediction operation section M10 and the battery current operation amount operated by the PI control section M9 and for subtracting from the subtotal a battery current Ib detected by the current sensor 67; a PI control section M12 for setting the electric potential difference Vo12 between the neutral points of the three-phase coils 24, 26 for adjusting the battery current by the use of the PI gain from the adder-subtracter M11; an adder M13 for obtaining a modulating signal by adding the electric potential difference Vo12 between the neutral points and each phase electric potential Vu1, Vv1, Vw1, Vu2, Vv2, Vw2; and a PWM operation section M14 for operating a modulating signal using a carrier wave to obtain a PWM signal.

In the control blocks, the blocks to the three-phase coils 24 and the blocks to the three-phase coil 26 are indicated as the same blocks. Other than the addition of the electric potential difference Vo12 between the neutral points and the respective processing of the three-phase coils 24, 26 by the phase difference corresponding to the shifted angle α between windings, the configuration from the current conversion section M1 to the two-phase to three-phase conversion section M7 and the current conversion section M4 is the same as that for ordinary motor control Through the operation of the PWM signal by the addition of the electric potential difference Vo12 between the neutral points operated by the components from the subtracter M8 to the PI control section M12 to each phase electric potential Vu1, Vv1, Vw1, Vu2, Vv2, Vw2 obtained by the two-phase to three-phase conversion section M7, three-phase alternating currents to be imposed on the three-phase coils 24, 26 can be set as waveforms offset from the median Vx as exemplified in FIG. 5 in order to maintain the voltage Vc of the capacitor 38 as the inverter input voltage Vi at the command value Vc* by the flowing of a current into the direct-current power supply 40.

Figures 7A, 7B:
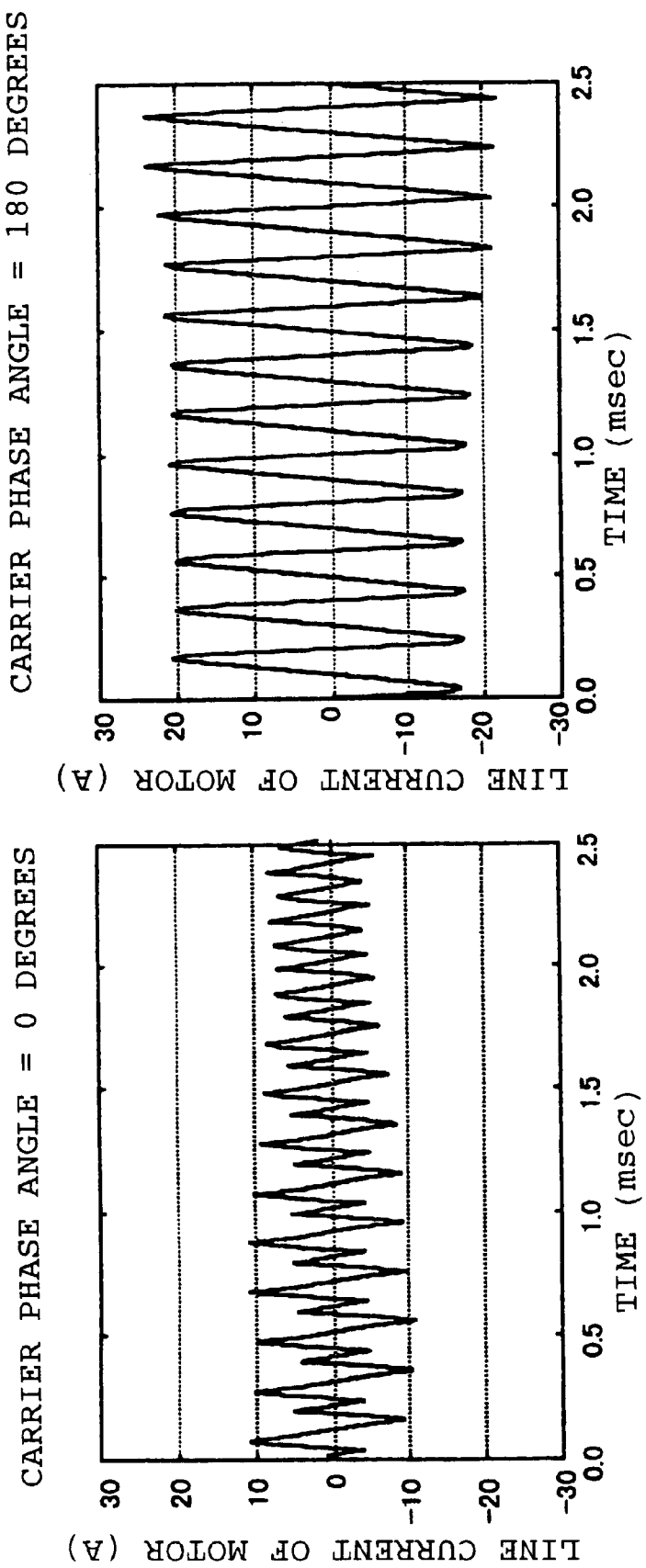
FIGS. 7(a) and 7(b) are explanatory diagrams showing example simulation results of current ripples when phase angles of a carrier wave are 0 degrees and 180 degrees.

When the phase angle on the three-phase coil 26 side to the three-phase coil 24 to be used in the PWM operation section M14 is changed, the motor line current ripple also changes. FIGS. 7(a) and 7(b) show example simulated results of current ripples when phase angles of a carrier wave are 0 degrees (FIG. 7(a)) and 180 degrees (FIG. 7(b)) under the conditions that the frequency is 100 Hz, the voltage Vc of the capacitor 38 is 400V, the voltage Vb of the direct-current power supply 40 is 100 V, the shifted angle a between windings are 30 degrees, and the current command values Id*, Iq* are severally 0 A. As shown in the diagrams, the current ripples become smaller when the phase angle of the carrier wave is 0 degrees.

According to the power output apparatus 20 of the embodiment described above, through connection of the direct-current power supply 40 between the neutral points of the three-phase coils 24, 26 of the 2Y motor 22, and by the adjustment of the electric potential difference Vo12 between the neutral points of the three-phase coils 24, 26, the voltage Vc between the terminals of the capacitor 38 as the inverter input voltage Vi can be flexibly controlled. Consequently, because the inverter input voltage Vi can be freely adjusted according to the driving states of the 2Y motor 22, the 2Y motor 22 can be more efficiently driven than when the inverter input voltage Vi is limited within a predetermined range or the case where the inverter input voltage Vi is fixed at a predetermined voltage. Moreover, because the voltage Vb of the direct-current power supply 40 can be freely selected, the degree of freedom of the designing of the direct-current power supply 40 is remarkably increased.

Figure 8:
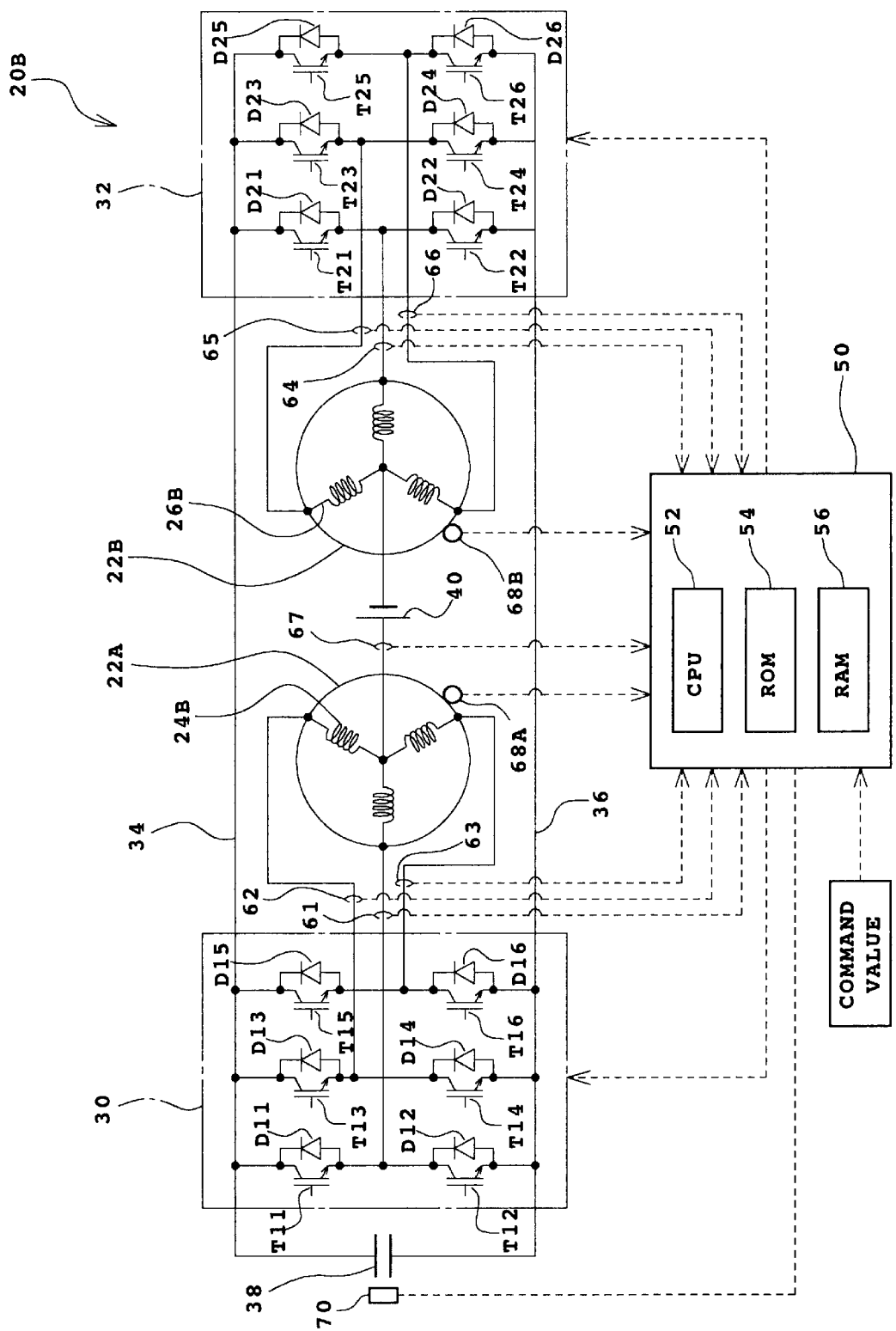
FIG. 8 is a schematic diagram showing the configuration of a modified power output apparatus 20B.

Although in the above example of the present embodiment, driving of the 2Y motor 22 including the three-phase coils 24, 26 is controlled, the present embodiment may also be configured using a modified power output apparatus 20B as shown in FIG. 8; a first motor 22A including a three-phase coil 24B; and a second motor 22B including a three-phase coil 26B. In such a case, rotation angle sensors 68A, 68B for detecting rotation angles θa, θb of respective rotators are provided to the first motor 22A and the second motor 22B, and a three-phase alternating current applied to the first motor 22A by the inverter circuit 30 is controlled by the rotation angle θa from the rotation angle sensor 68A. Additionally, control of a three-phase alternating current applied to the second motor 22B by the inverter circuit 32 is based on the rotation angle θb from the rotation angle sensor 68B. By such control, driving of each of the first motor 22A and the second motor 22B can be independently controlled. The power output apparatus 20B, being a modification, has two output shafts of the rotation shaft of the first motor 22A and the rotation shaft of the second motor 22B.

Although the capacitor 38 is connected between the positive pole bus 34 and the negative pole bus 36 in the power output apparatuses 20 and 20B, a direct-current power supply may be connected in place of the capacitor 38.

Figure 9:
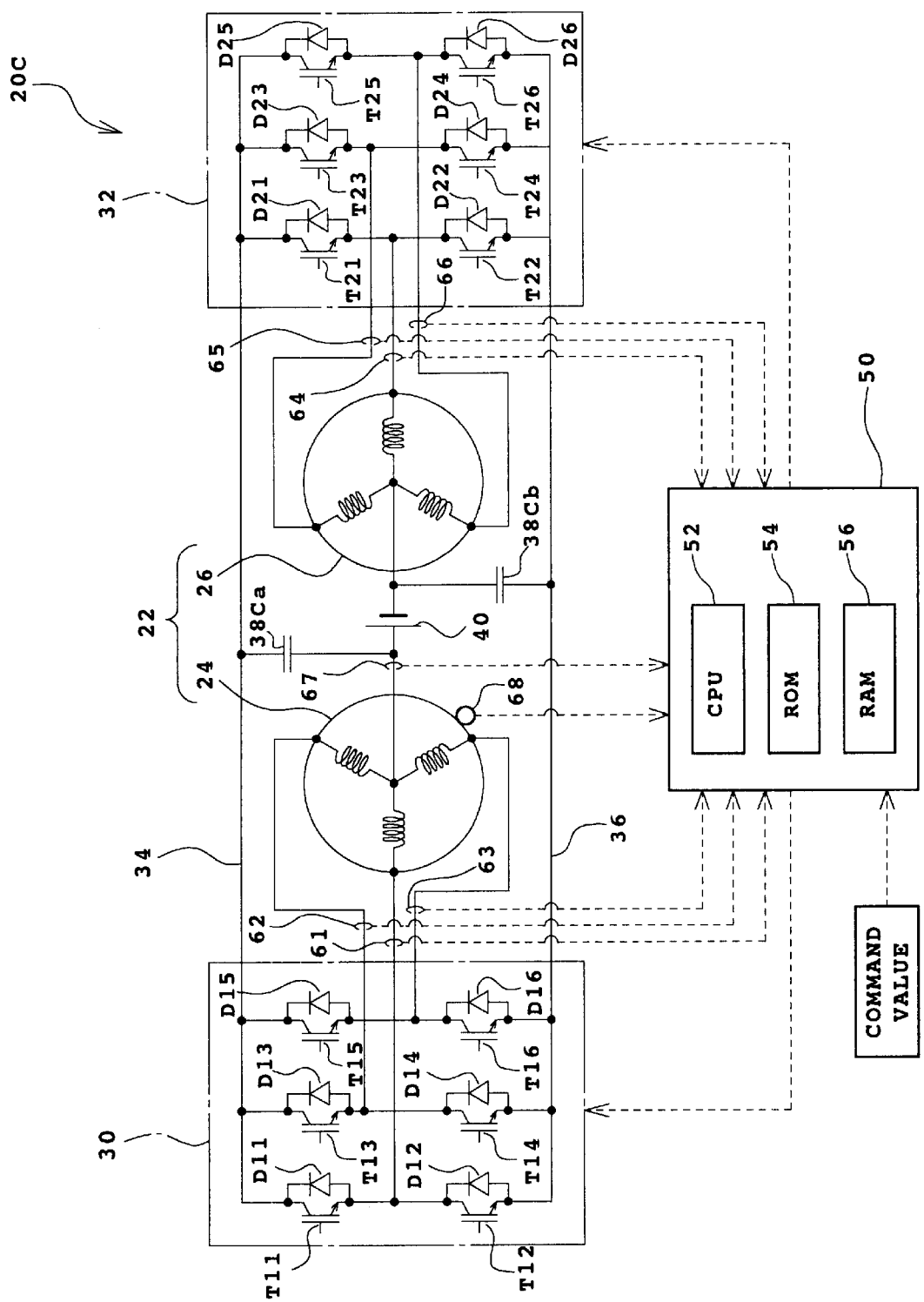
FIG. 9 is a schematic diagram showing the scheme of the configuration of a modified power output apparatus 20C.
Figure 10:
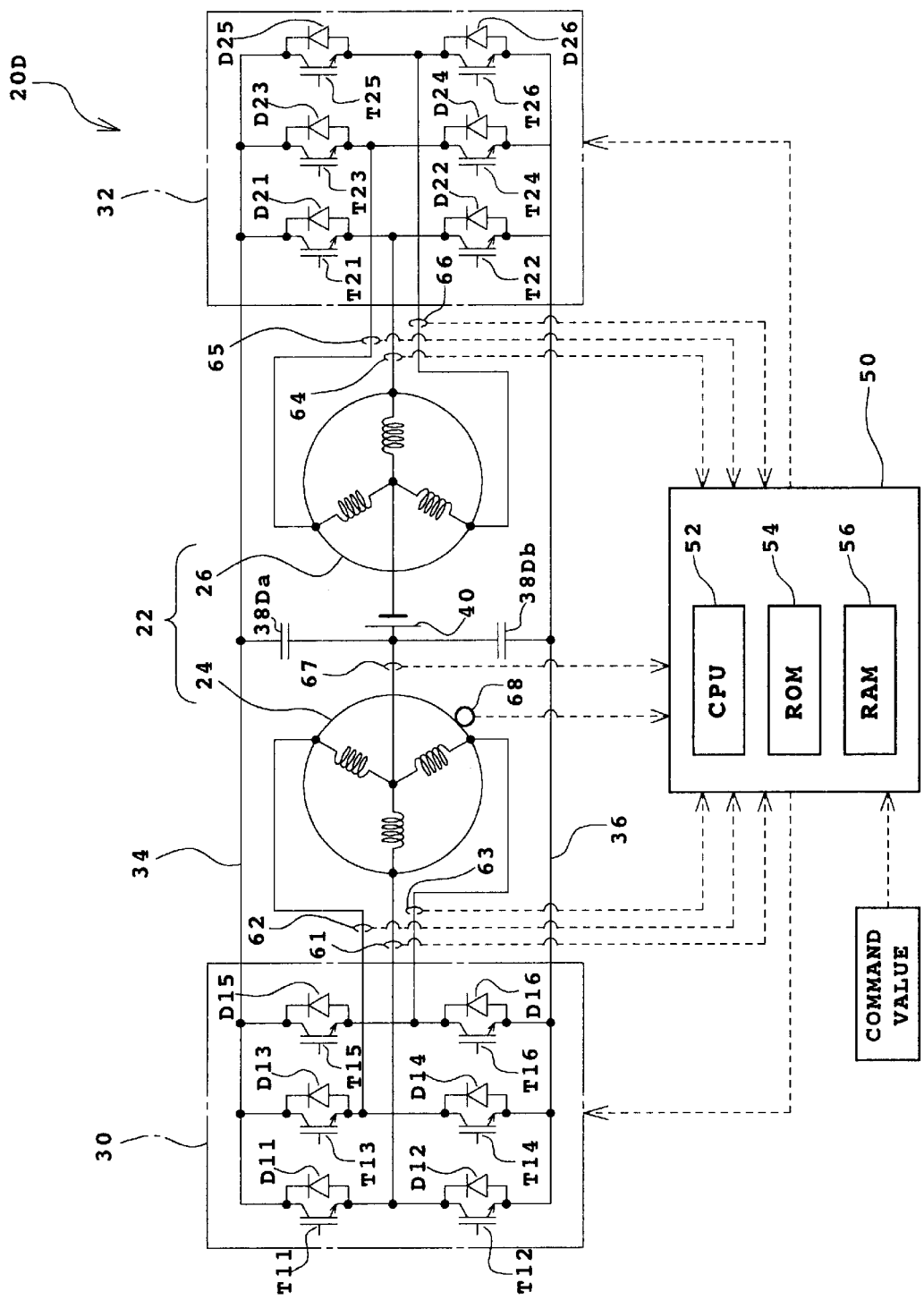
FIG. 10 is a schematic diagram showing the scheme of the configuration of a modified power output apparatus 20D.
Figure 11:
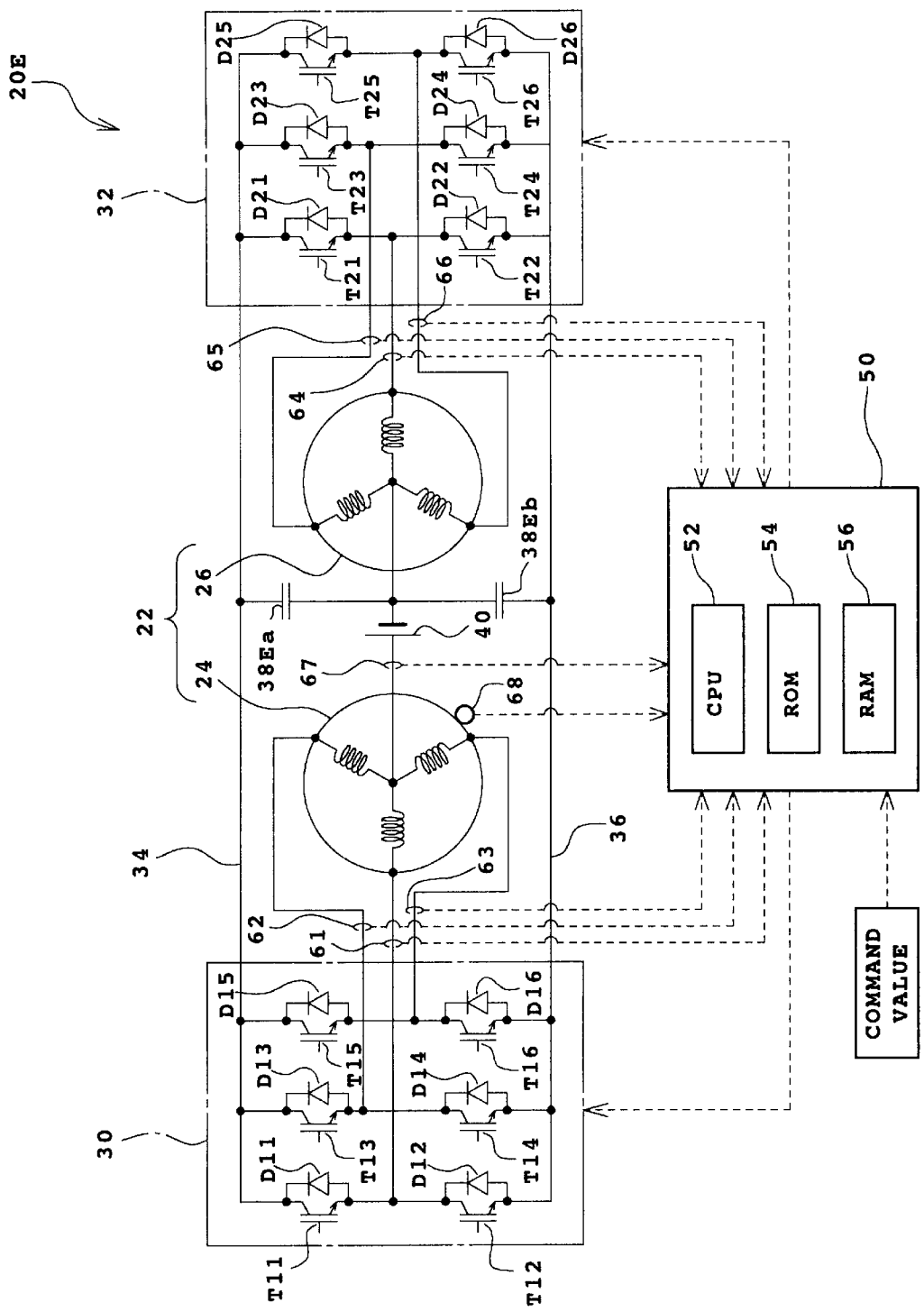
FIG. 11 is a schematic diagram showing the scheme of the configuration of a modified power output apparatus 20E.

Although the capacitor 38 is connected between the positive pole bus 34 and the negative pole bus 36 in the example power output apparatus 20 described above, as exemplified in the power output apparatus 20C shown in FIG. 9, the power output apparatus 20C may be configured such that a capacitor 38Ca is connected between the positive pole bus 34 and the neutral point of the three-phase coil 24 and a capacitor 38Cb is connected between the neutral point of the three-phase coil 26 and the negative pole bus 36. By employing such a configuration, the withstand voltages of the capacitors 38Ca, 38Cb can be lowered. Moreover, as exemplified in a power output apparatus 20D shown in FIG. 10, the power output apparatus 20D may be configured such that a capacitor 38Da is connected between the positive pole bus 34 and the neutral point of the three-phase coil 24 and a capacitor 38Db is connected between the neutral point of the three-phase coil 24 and the negative pole bus 36. Still further, as exemplified in a power output apparatus 20E shown in FIG. 11, the power output apparatus 20E may be configured such that a capacitor 38Ea is connected between the positive pole bus 34 and the neutral point of the three-phase coil 26 and a capacitor 38Eb may be connected between the neutral point of the three-phase coil 26 and the negative pole bus 36. In these modified power output apparatuses 20C, 20D, 20E, an electric potential difference sensor may be provided between the positive pole bus 34 and the negative pole bus 36 for detecting the electric potential difference between the buses, or the electric potential difference of each capacitor may be detected.

Figure 12:
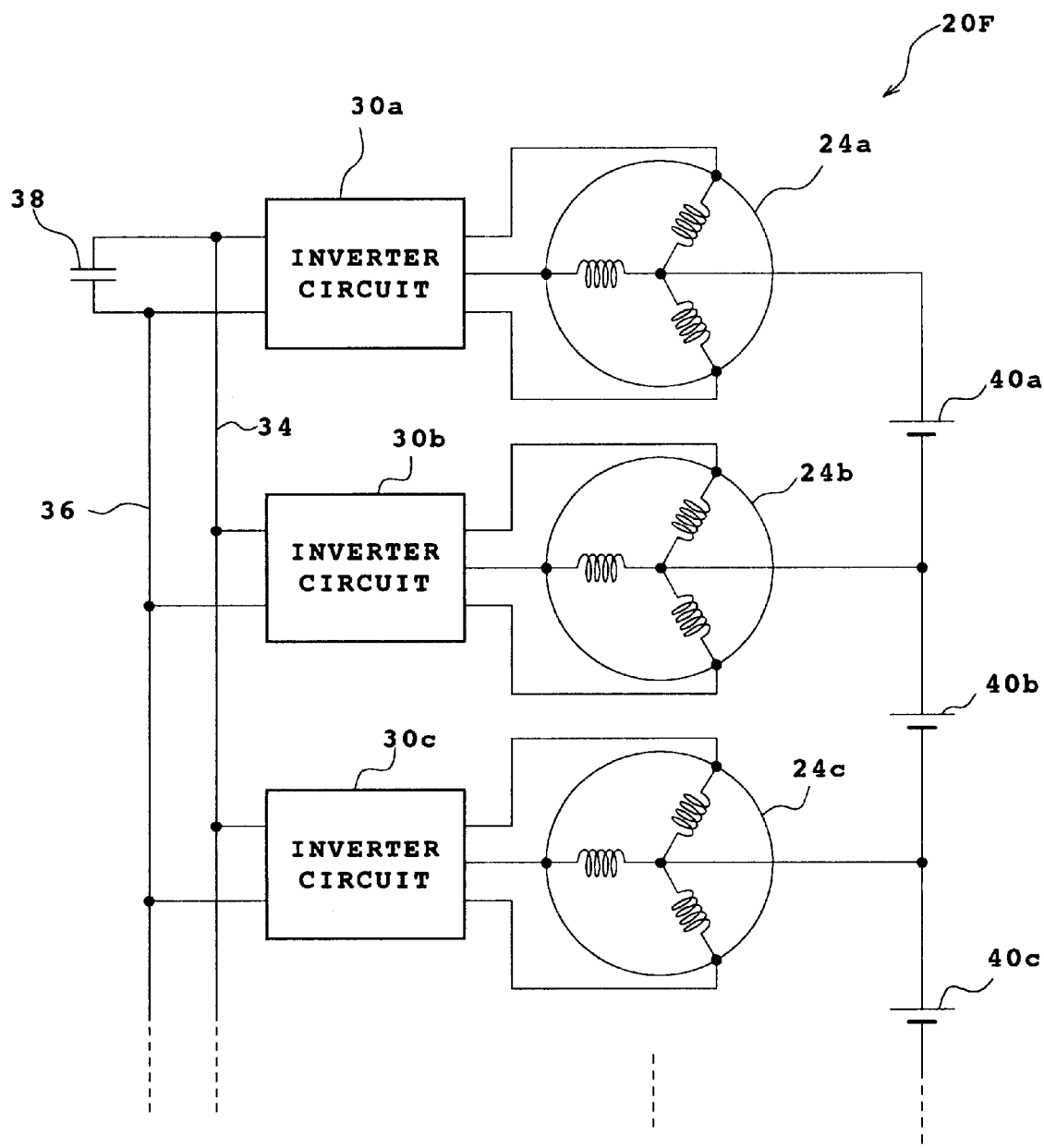
FIG. 12 is a schematic diagram showing the scheme of the configuration of a modified power output apparatus 20F.

Although in the first example described above, the direct-current power supply 40 is connected between the neutral points of the two three-phase coils 24, 26 to which electric power is supplied by two inverter circuits 30, 32, as exemplified in a power output apparatus 20F shown in FIG. 12, the power output apparatus 20F may be configured such that each neutral point of three three-phase coils or more 24a, 24b, 24c . . . to which electric power is supplied by three inverter circuit 30a, 30b, 30c . . . or more may be connected in series with direct-current power supplies 40a, 40b, 40c . . . .

Further, although in the above description, the direct-current power supply 40 is connected between the neutral points of the two three-phase coils 24, 26, the coils are not limited to three-phase coils, and a direct-current power supply may be connected between the neutral points of a polyphase alternating current coil.

Still further, although the power output apparatus 20 has been described as a power output apparatus equipped with a double-winding motor, it is obvious that the present invention can also be applied to an apparatus that does not output power, as long as the apparatus variably controls the input voltage of an inverter circuit.

Capacitor Voltage Control

As described above, in the present embodiment, a direct-current power supply is disposed between neutral points of two polyphase coils and the switching of inverters for controlling power supply to the two polyphase coils.

Thereby, a capacitor voltage being a power supply of the two inverters is controlled.

Figure 13:
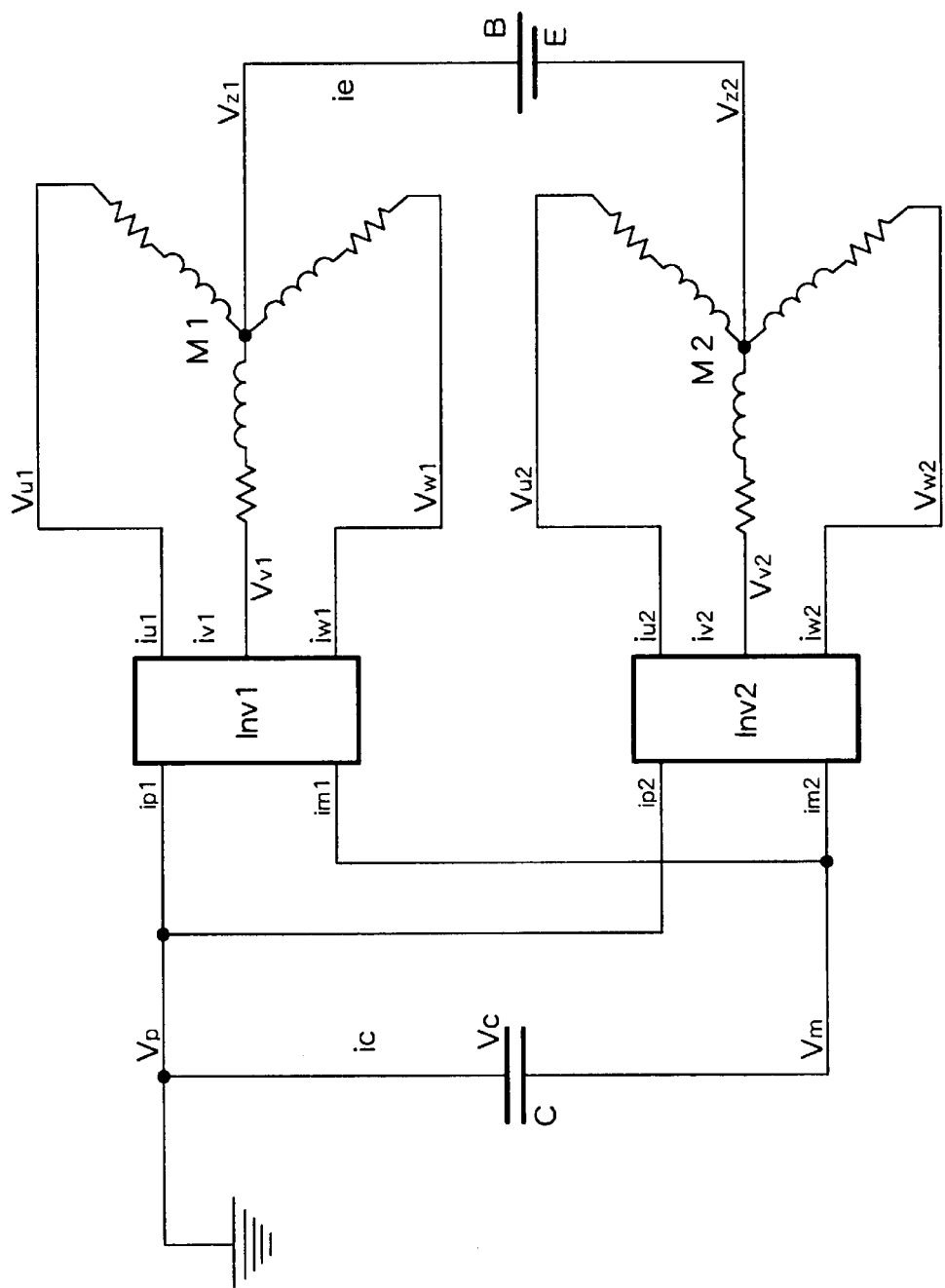
FIG. 13 is a diagram showing the configuration of 2YDC.

When the 2YDC system of the embodiment is redrawn by the omission of the inside of the inverters, the 2YDC system can be expressed as shown FIG. 13.

That is, one end of a capacitor C is connected with a power source (e.g. earth) of a fixed voltage. Then, both the ends of the capacitor C are respectively connected with an inverter INV1 and an inverter INV2. As such, the output of the capacitor C is input into the inverters INV1, INV2 as an input.

The inverter INV1 has three-phase outputs U1, V1, W1 to which three-phase coils of U, V, W of a motor coil M1 are respectively connected. Moreover, the inverter TNV2 has three-phase outputs U2, V2, W2 to which three-phase coils of U, V, W of a motor coil M2 are respectively connected.

Although in the figures the motor coils M1, M2 are separately shown, the motor coils M1, M2 are in fact coils of one motor. In an ordinary case, the motor coils M1, M2 are disposed in a motor to differ from each other by a predetermined angle, and electric currents different from each other in phase by the predetermined angle are supplied to the motor coils M1, M2. Thereby, both currents to be supplied to both the motor coils M1, M2 function as motor driving currents.

Each phase motor coil of the motor coils M1, M2 is commonly connected at neutral points, and the neutral points of the motor coils M1, M2 are connected to each other through a battery B. In this example, the positive pole of the battery B is connected to the neutral point of the motor coil M1, and the negative pole of the battery B is connected to the neutral point of the motor coil M2.

Also, although not shown in the figure, the inverters INV1, INV2 severally have three arms composed of a series connection of two switching transistors disposed between a first power supply "p" and a second power supply "m" (the first power supply "p" is earth in the shown example), and the central points of these arms are connected with the end of each phase coil.

Consequently, by the control of turning on and off of the switching transistors in the inverters INV1, INV2, a desired electric current is supplied from the capacitor C to the motor coils M1, M2 to drive them. Moreover, by the setting of the lengths of the on-period of the upper side transistors and the lower side transistors in the inverters INV1, INV2 to be different from each other, the electric currents (zero-phase currents) other than the electric currents for motor driving input or output from the neutral points of the motor coils M1, M2 are controlled.

In the present embodiment, the inverters INV1, INV2 are driven by a voltage (output voltage) Vc of both the terminals of the capacitor C as a power supply. Then, a voltage (output voltage) E of both the ends of the battery B does not basically change. Accordingly, by control of the zero-phase currents, the central point electric potential of the motor coils M1, M2 can be arbitrarily set while the difference by the voltage of the battery B is maintained.

Also, as shown in FIG. 13, the voltage of the first power supply p is Vp; the voltage of the second power supply m is Vm; the output current of the capacitor C is ic; the voltage of both end of the capacitor C is $$Vc\ (=|Vm-Vp|);$$

the electric current of the inverter INV1 from the first power supply p is ip1; the electric current of the inverter INV1 from the second power supply m is im1; the electric current of the inverter INV2 from the first power supply p is ip2; and the electric current of the inverter INV2 from the second power supply m is im2. Moreover, for the motor coils M1, the u-phase current is iu1; the v-phase current is iv1; the w-phase current is iw1; the u-phase end voltage is Vu1; the v-phase end voltage Vv1; and the w-phase end voltage Vw1. For the motor coil M2, the u-phase current is iu2; the v-phase current is iv2; the w-phase current is iw2; the u-phase end voltage is Vu2; the v-phase end voltage Vv2; and the w-phase end voltage is Vw2. The neutral point voltage of the motor coil M1 is Vz1; the neutral point voltage of the motor coil M2 is Vz2; the battery B voltage is E; and the zero-phase current is ie.

In particular, in the present system, the relationship between the neutral point electric potential Vz1, Vz2 of the motor coils M1, M2 and the power supply voltages of the inverters INV1, INV2, i.e. the output voltage Vc of the capacitor C is determined by the ratios of on-periods of the upper side transistors and the lower side transistors in the inverters INV1, INV2, and the electric potential difference between the neutral points of the two motor coils M1, M2 is the battery B voltage $$E(=|Vz1-Vz2|).$$

Consequently, the voltage at each end of the capacitor C is determined by the ratios (percentage modulations) of the on-periods of the upper side transistors and the lower side transistors of the inverters INV1, INV2.

Figure 14:
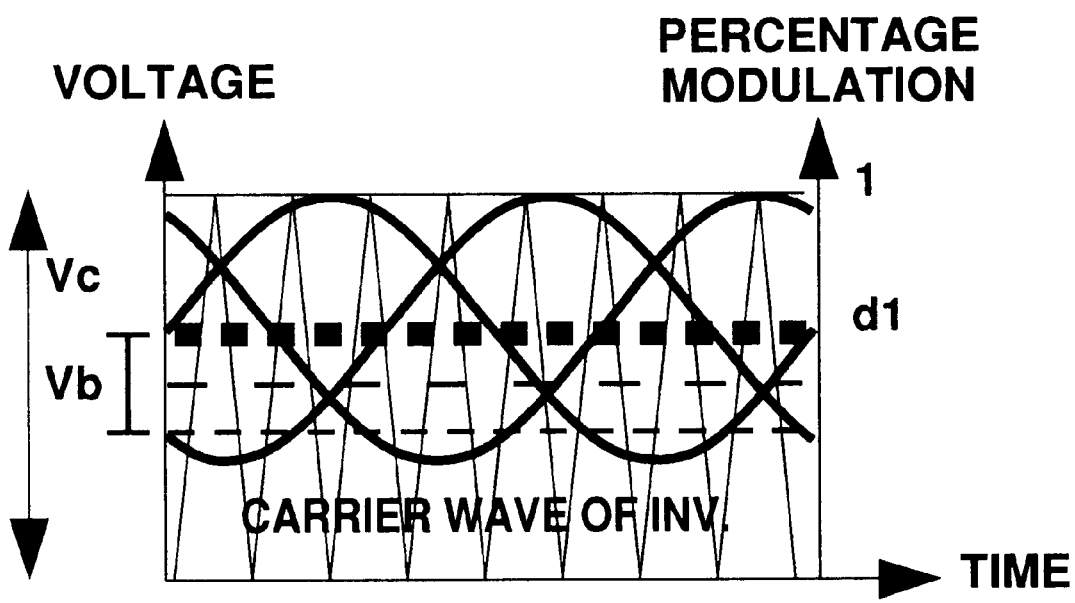
FIGS. 14(a) and 14(b) are diagrams showing the relationship between voltage command values and the carrier waves of an inverter.
Figure 14:
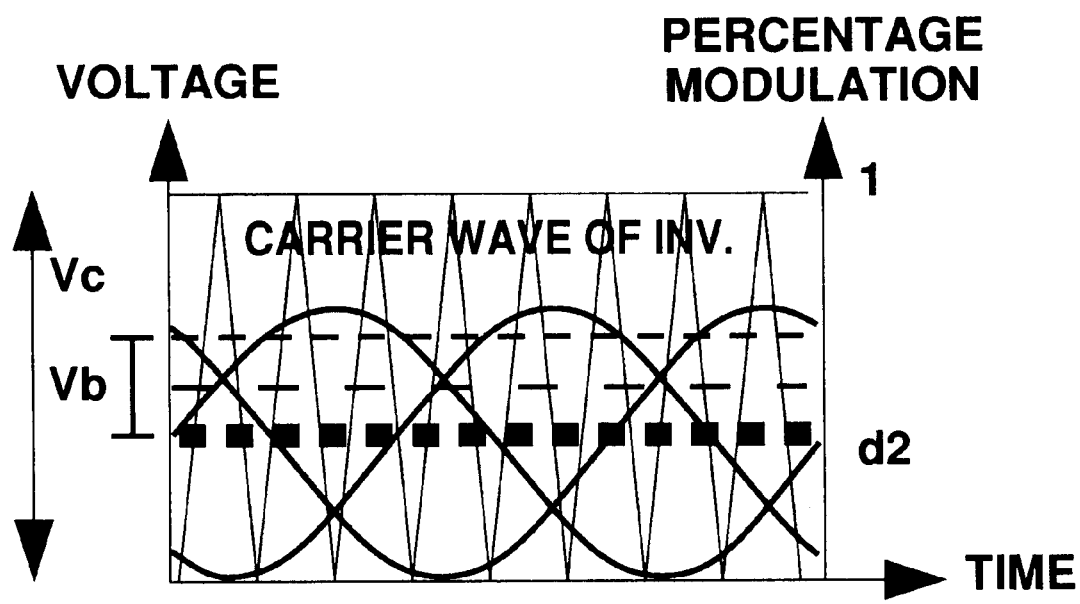

Moreover, the inverters INV1, INV2 control the neutral point electric potential Vz1, Vz2 of the motor coils M1, M2 by controlling the switching transistors therein by the PWM control. Now, as shown in FIGS. 14(a), 14(b), the ratios (percentage modulations) of the on-periods of the upper side transistors and the on-periods of the lower side transistors are the ratios of the amplitudes of voltage command values to a period of a carrier wave being a triangular wave. That is, when the voltage command value is made to be higher, the period during which the triangular wave exceeds the command value decreases to that degree. Then, by setting the period during which the triangular wave exceeds the command value to be equal to either the on-period of the upper side transistor of each phase or to the off-period of the lower side transistor, the ratio of the on-periods of the upper and the lower transistors (i.e. percentage modulation) is determined. FIG. 14(a) shows the percentage modulation d1 of the inverter INV1, and FIG. 14(b) shows the percentage modulation d2 of the inverter INV2.

As described above, the neutral point electric potential is determined from the percentage modulation, and the ratio of the neutral point electric potential and the capacitor voltage is determined by the percentage modulation. Moreover, the potential difference between the two neutral point electric potential is the voltage E of the battery B. Consequently, the following relationship is maintained between the percentage modulation and the capacitor voltage Vc:

$$Vc=E/(d1-d2).$$

Accordingly, the capacitor voltage Vc can be determined by the control of the percentage modulations of the two inverters INV1, INV2.

Incidentally, in the example described above, the switching transistors are turned on or off without a dead time to the carrier frequency Ts of the inverters. That is, when the duty ratio is 50%, both the upper and the lower transistors are turned on for the period of 50%. However, there are may cases where dead times Td during which both the upper and the lower transistors are turned off are interposed for eliminating any pass through current during switching periods completely. In these cases, the aforesaid formula is applied after being rewritten as follows:

$$Vc=E/\{d1-Td/Ts)-(d2+Td/Ts)\}.$$

As described above, even if dead times are interposed, the capacitor voltage Vc can be determined by the control of the percentage modulations d1, d2.

Figure 15:
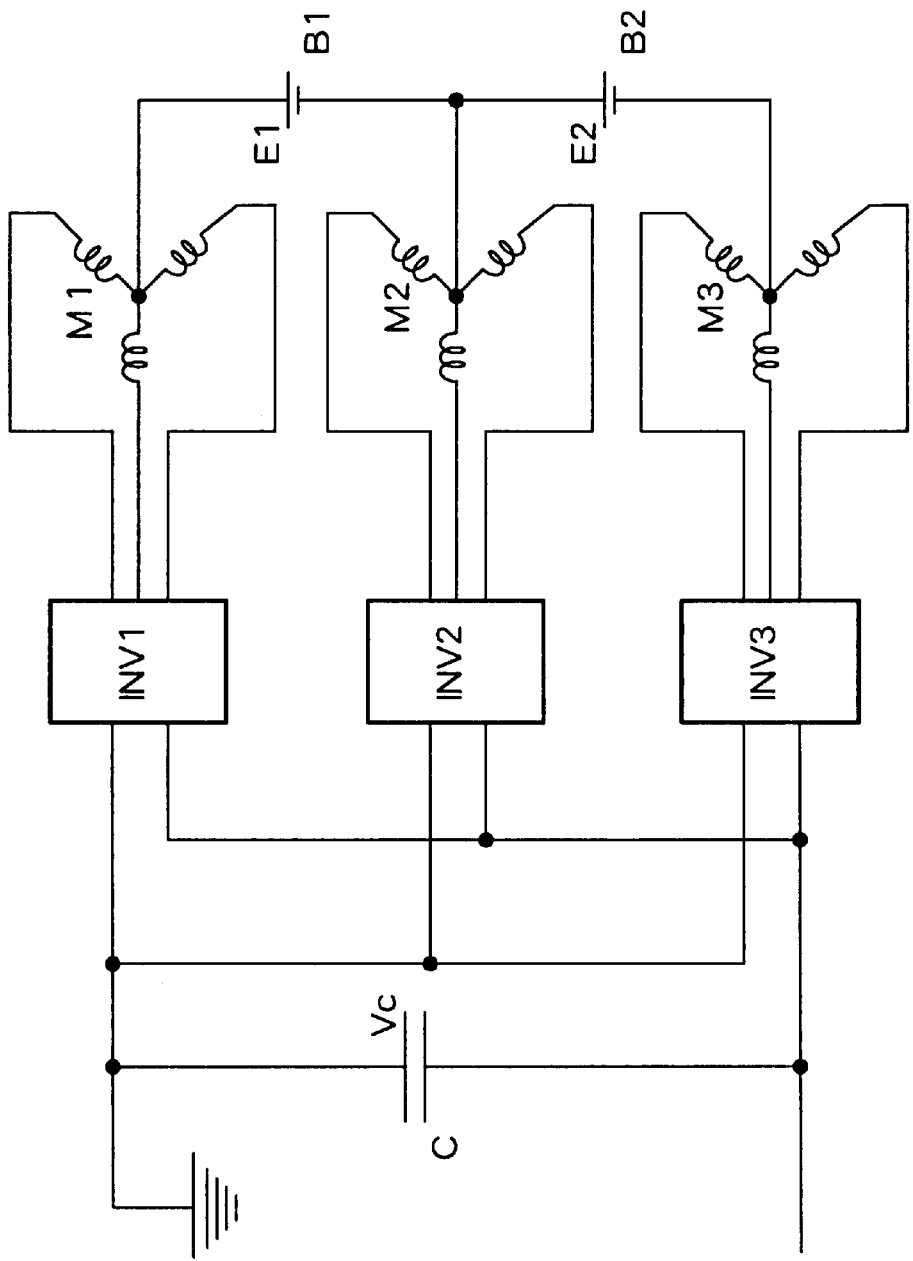
FIG. 15 is a diagram showing an example apparatus having three motor coils.

FIG. 15 shows a still further modification. This example includes three motor coils M1, M2, M3, wherein the neutral points of the motor coils M1, M2 are connected with a battery B1, and the neutral points of the motor coils M2, M3 are connected with a battery B2. Additionally, the outputs of an inverter INV1 are connected with the motor coil M1; the outputs of an inverter INV2 are connected with the motor coil M2; and the outputs of an inverter INV3 are connected with the motor coil M3. Then, the inputs of the inverters INV1, INV2, INV3 are connected with both the ends of a capacitor C.

In such a system, provided that the output voltage of the capacitor C is Vc, the output voltage of the battery B1 is E1, the output voltage of the battery B2 is E2, the percentage modulation of the inverter INV1 is d1, the percentage modulation of the inverter INV2 is d2, and the percentage modulation of the inverter INV3 is d3, these values will satisfy the following relation:

$$VC=E1/(d1-d2)=E2/(d2-d3).$$

Accordingly, when the percentage modulations d1, d2, d3 are controlled to satisfy the aforementioned formula, a desired capacitor voltage Vc can be obtained. Moreover, when the values of d1−d2 and d2−d3 are set to be different from each other, electric charges can be transported between the batteries B1, B2.

Incidentally, although there are three motor coils M1, M2, M3, if four motor coils or more are provided, similar control can be executed. Moreover, a plurality of motor coils may constitute one electric motor, or may constitutes a plurality of electric motors.

Suppression of Amplitude Maximum Value

Next, the suppression of current amplitude maximum values in the present system is described. This is achieved by alteration of the distribution of electric current to the two motor coils M1, M2.

Effects of the Embodiment

Concrete examples of the control of the present embodiment will be described below. First, however, to illustrate the effect of current decrease of the present invention the relationship between motor outputs and phase currents will be shown using simulated values.

The simulation was performed using the following procedure. First, a phase current iu1 of one phase (here upon u-phase) is divided into an average value (direct-current component) idc per one rotation and the other components (alternating-current components) iac. Moreover, as for the alternating-current components iac, a function g(θ) normalized by their amplitudes Iac is introduced.

That is:

$$i_{u1} = i_{ac} + i_{dc} \tag{1}$$

$$i_{dc} = \int_0^{2\pi} i_{u1} d\theta \tag{2}$$

$$i_{ac} = i_{u1} - i_{dc} \tag{3}$$

$$I_{ac} = \max_\theta(i_{ac}) - \min_\theta(i_{ac}) \tag{4}$$

$$g(\theta) = i_{ac}/I_{ac} \tag{5}$$

Successively, a voltage Vw is defined on the basis of the relation between the battery voltage E and the capacitor voltage Vc of the present system. This is done because, for the amplitude Iac of the phase current, the voltage obtained by the subtraction of the battery voltage E from the capacitor voltage Vc assumes the maximum value. Moreover, it is assumed that voltages vv which are simultaneously applied to each coil change with a fixed phase difference (power factor cosΦ) from the afore said electric current iac.

That is, the following relations are assumed.

$$Vw=Vc-E \tag{6}$$

$$Vv=Vwg(\theta+\Phi) \tag{7}$$

Moreover, as for the relation between the motor output Wo and the work performed by each coil, because there are six coils, the relation can be arranged as follows.

$$W_o = 6\frac{1}{2\pi}\int_0^{2\pi}(i_{ac}+i_{dc})v_v d\theta \tag{8}$$

$$= 6\left(\frac{1}{2\pi}\int_0^{2\pi}i_{ac}v_v d\theta + \frac{1}{2\pi}\int_0^{2\pi}i_{dc}v_v d\theta\right) \tag{9}$$

$$= 6\left(\frac{1}{2\pi}\int_0^{2\pi}i_{ac}V_w g(\theta+\phi)d\theta + 0\right) \tag{10}$$

$$= 6\frac{1}{2\pi}I_{ac}V_w\int_0^{2\pi}g(\theta)g(\theta+\phi)d\theta \tag{11}$$

$$I_{ac} = \frac{2\pi}{6}\frac{W_o}{V_w\int_0^{2\pi}g(\theta)g(\theta+\phi)d\theta} \tag{12}$$

Moreover, when the loss of a motor output is assumed to be very small, the motor output maybe approximated as Wo=ieE. From this relation, the following formula can be obtained:

$$Ie=Wo/E \tag{13}$$

Consequently, the electric current flowing in each phase coil can be obtained by the following formula through use of Iac and ie, both of which can obtained from the formulae (12), (13). However, the ripple components of the ie are not considered.

$$i_{\max} = \max_\theta(I_{ac}+i_e/3) \tag{14}$$

Next, conditions to be used for analysis are shown. The battery voltage E=42V or 105V. The capacitor voltage Vc=210V (boosting rate Vc/E=5 or 2). The power factor cosθ=0.8. Differences of the maximum values of alternating-current amplitudes to the motor output Wo owing to conducting methods under these conditions are shown.

Figure 16A:
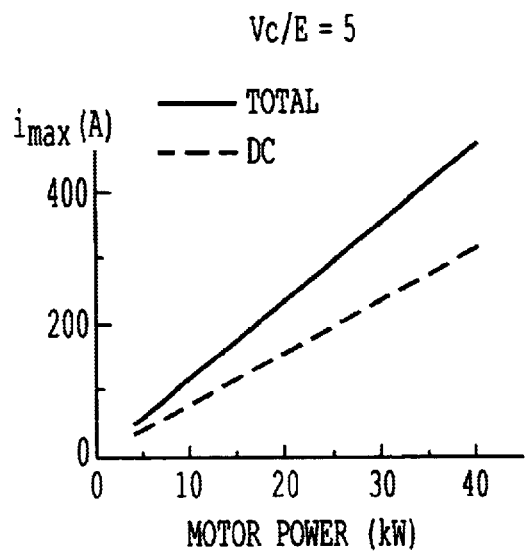
FIG. 16 is a diagram showing the maximum values of current amplitudes in a conventional method for transmitting an electric current.
Figure 16B:
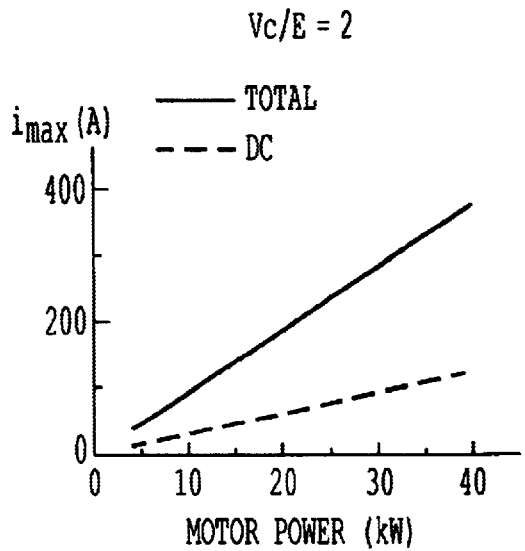
Figure 17A:
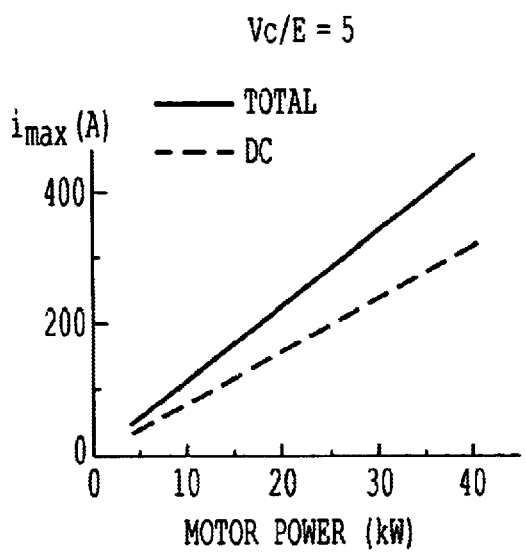
FIG. 17 is a diagram showing the maximum values of current amplitudes when electric current decreases at the time of being inadmissible of zero-phase ripples.
Figure 17B:
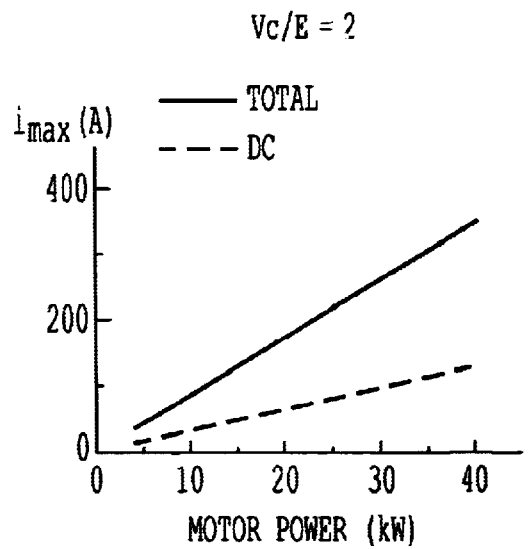
Figure 19A:
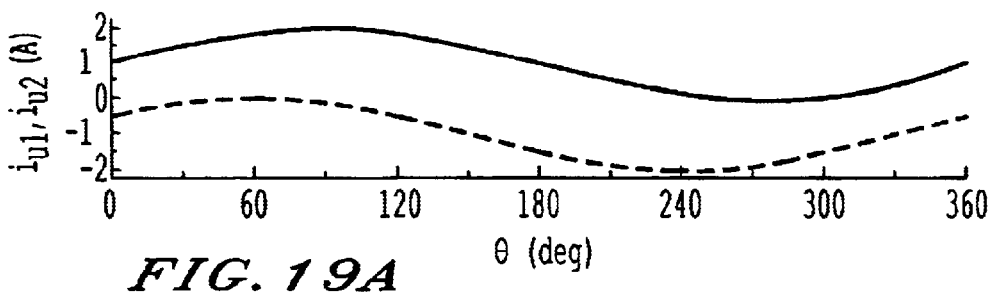
FIG. 19 is a diagram showing phase currents.
Figure 19B:
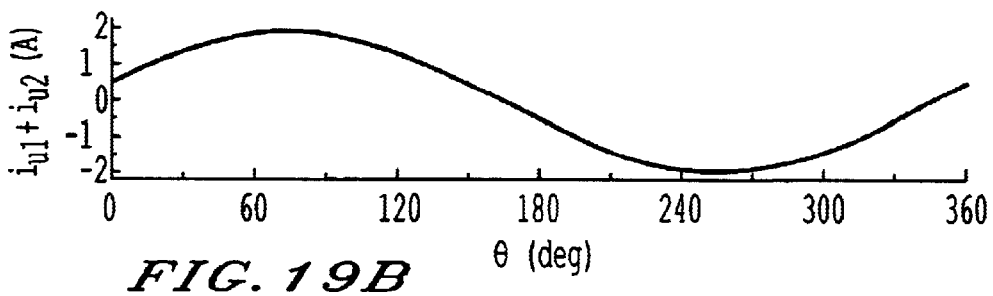
Figure 19C:
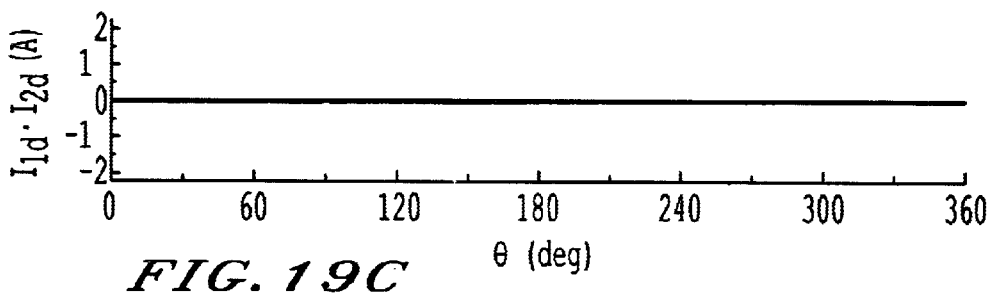
Figure 19D:
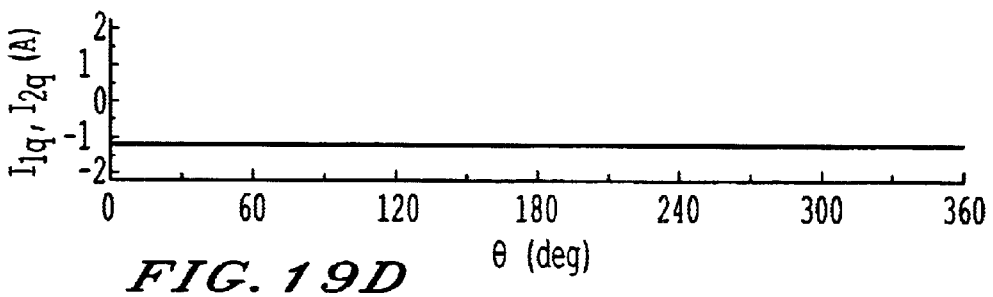
Figure 19E:
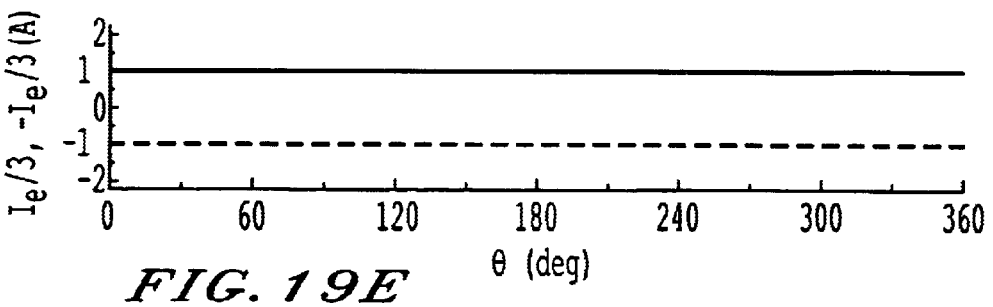
Figure 20A:
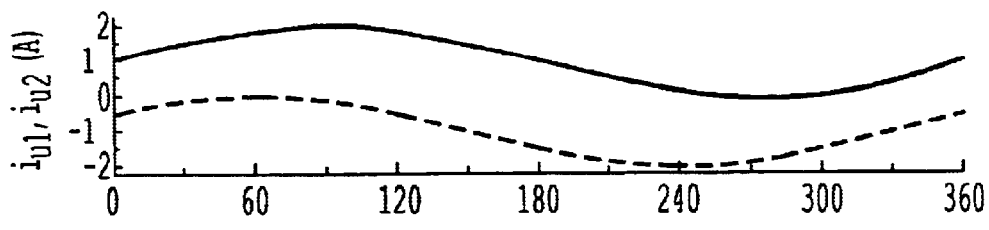
FIG. 20 is a diagram showing phase currents when there is a phase difference between coils.
Figure 20B:
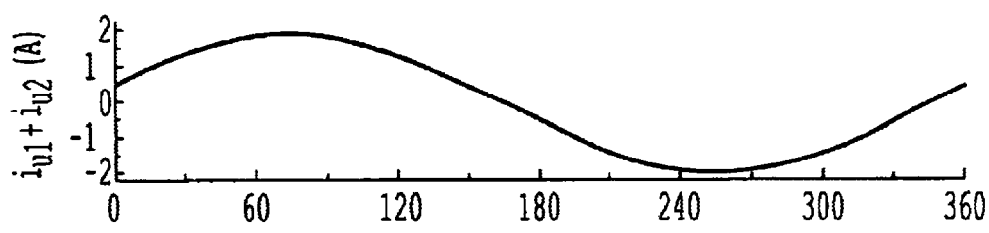
Figure 20C:
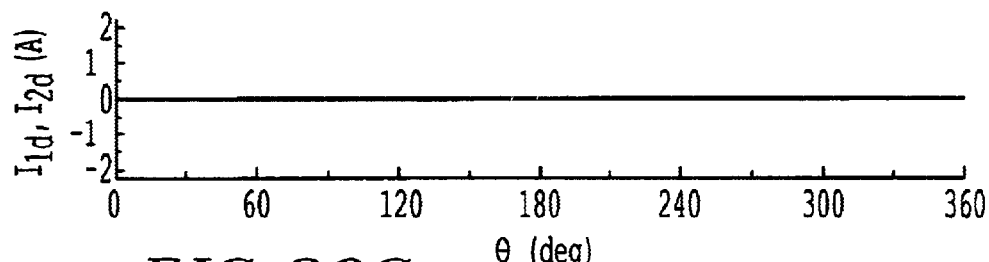
Figure 20D:
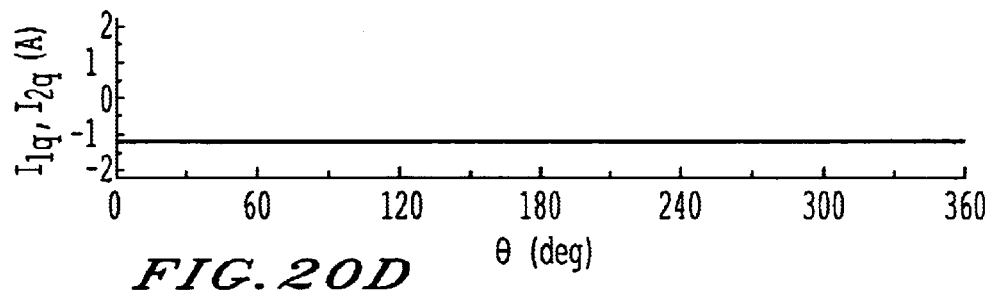
Figure 20E:
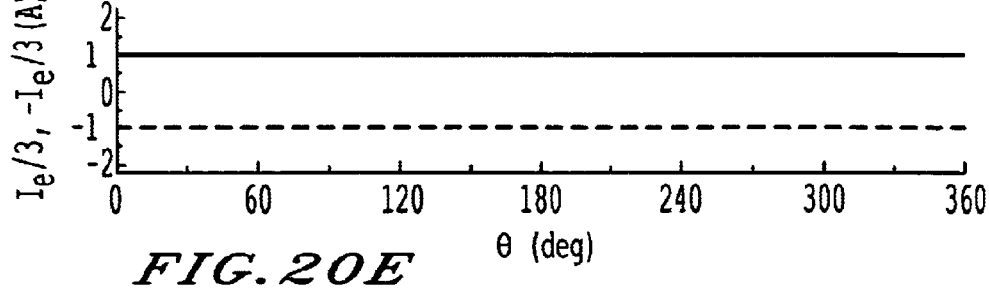

The results are shown in FIG. 16 to FIG. 18. These figures show the differences of the phase current maximum values resulting from boosting rates. In the graphs, the abscissa indicate motor outputs, and the ordinate indicate phase current maximum values (imax). Continuous lines indicate phase current maximum values, while broken lines indicate direct-current components (ie/3) of the phase current maximum values.

FIG. 16 shows conventional phase current maximum values at the time of current supplying, FIG. 17 shows the phase current maximum values at the time of conducting while the maximum values are suppressed under the condition of being inadmissible of zero-phase ripples, and FIG. 18 shows the phase current maximum values in case of a maximum suppressing conducting method (4. 2. 2. nodes) under the condition of being admissible of zero-phase ripples.

The following can be understood from these figures.

In all cases, the sizes of the phase currents vary greatly according to the boosting rates. The larger are the boosting rates, the larger are the rates of the direct-current components occupying the phase currents.

Moreover, the suppressing effect of the phase current size owing to the difference of conducting methods can be ascertained.

When the phase voltage maximum values (alternating-current components, direct-current components) are compared under the conditions that Wo=40 kW and that the boosting rate is 5, the maximum value is 477A (159, 317A) in the conventional conducting shown in FIG. 16, and the maximum value is 454A (136, 317A) in FIG. 17, and further the maximum value is 402A (85, 317A) in FIG. 18.

Description of a Conventional Conducting Method as a Basis of Present Invention

A conventional conducting method of the 2Y DC variable type inverter shown in FIG. 16 will be described.

When the zero-phase current, the alternating-current amplitude, the rotor rotation number, and rotor rotation angle are respectively designated by ie, A, ω and θ (θ=ωt), phase currents iu1, iv1, iw1, iu2, iv2, iw2, which are ordinarily flown in the 2Y DC variable type inverter shown in FIG. 13, can be expressed by the following formulae.

$$i_{u1r} = A\sin(\theta) + i_e/3 \tag{15}$$

$$i_{v1r} = A\sin\left(\theta - \frac{2\pi}{3}\right) + i_e/3 \tag{16}$$

$$i_{w1r} = A\sin\left(\theta - \frac{4\pi}{3}\right) + i_e/3 \tag{17}$$

$$i_{u2r} = A\sin(\theta) - i_e/3 \tag{18}$$

$$i_{v2r} = A\sin\left(\theta - \frac{2\pi}{3}\right) - i_e/3 \tag{19}$$

$$i_{w2r} = A\sin\left(\theta - \frac{4\pi}{3}\right) - i_e/3 \tag{20}$$

When A=1(A) and ie=3(A), the formulae (15)–(20) have the relation shown in FIG. 19. Each step in FIG. 19 shows the following: a first step from the top shows each electric current iu1, iu2; a second step shows the summation of the currents iu1, iu2; a third step shows d-axis currents id1, id2 after the d–q axis conversion of the phase current; a fourth step shows q-axis currents iq1, iq2; and the final step shows one third (for one phase) of the zero-phase current ie.

When reluctance torque is not considered, iq1+iq2 is a current component that contributes to motor torque (because a magnetic position is not included in the analysis in the present case, it can also be said that iu1+iu2 is the current component that contributes to the motor torque), and ie is an electric current flowing between a battery and a capacitor. Then, the maximum value of the phase current at this time is 2.00 (A). In FIG. 19, the condition of an electric current for generating motor driving torque and an electric current between the battery and the capacitor can be written as formula (21).

$$\begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 1 & 1 & 0 & 0 & 0 \\ 0 & 0 & 0 & 1 & 1 & 1 \end{pmatrix} \begin{pmatrix} i_{u1r} \\ i_{v1r} \\ i_{w1r} \\ i_{u2r} \\ i_{v2r} \\ i_{w2r} \end{pmatrix} = \begin{pmatrix} 2A\sin(\theta) \\ 2A\sin\left(\theta - \frac{2\pi}{3}\right) \\ 2A\sin\left(\theta - \frac{4\pi}{3}\right) \\ i_e \\ -i_e \end{pmatrix} \tag{21}$$

Moreover, by the introduction of formulae (22), (23), the formula (21) can be rewritten as follows. In formula (24), id, iq designate current components expressed by the d-q axis, and are constants here.

$$U = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{pmatrix} \tag{22}$$

$$T(\theta) = \begin{pmatrix} \cos\theta & \sin\theta \\ -\sin\theta & \cos\theta \end{pmatrix} \tag{23}$$

$$\begin{pmatrix} T(\theta) & \begin{pmatrix} 0 \\ 0 \end{pmatrix} & T(\theta) & \begin{pmatrix} 0 \\ 0 \end{pmatrix} \\ \begin{pmatrix} 0 & 0 \\ 0 & 0 \end{pmatrix} & \begin{pmatrix} \sqrt{3} \\ 0 \end{pmatrix} & \begin{pmatrix} 0 & 0 \\ 0 & 0 \end{pmatrix} & \begin{pmatrix} 0 \\ \sqrt{3} \end{pmatrix} \\ & U & \begin{pmatrix} 0 & 0 & 0 \\ 0 & 0 & 0 \\ 0 & 0 & 0 \end{pmatrix} \\ \begin{pmatrix} 0 & 0 & 0 \\ 0 & 0 & 0 \\ 0 & 0 & 0 \end{pmatrix} & U \end{pmatrix} \begin{pmatrix} i_{u1r} \\ i_{v1r} \\ i_{w1r} \\ i_{u2r} \\ i_{v2r} \\ i_{w2r} \end{pmatrix} = \begin{pmatrix} i_d \\ i_q \\ i_e \\ -i_e \end{pmatrix} \tag{24}$$

When there is a phase difference between windings of a motor (in the case where the coil positions of a certain star connection is shifted from the coil positions of another star connection by an angle ξ), the conducting currents can be rewritten as formulae (25)–(30), and the formula (24) is rewritten as a formula (31).

$$i_{u1r} = A\sin(\theta) + i_e/3 \tag{25}$$

$$i_{v1r} = A\sin\left(\theta - \frac{2\pi}{3}\right) + i_e/3 \tag{26}$$

$$i_{w1r} = A\sin\left(\theta - \frac{4\pi}{3}\right) + i_e/3 \tag{27}$$

$$i_{u2r} = A\sin(\theta + \xi) - i_e/3 \tag{28}$$

$$i_{v2r} = A\sin\left(\theta + \xi - \frac{2\pi}{3}\right) - i_e/3 \qquad (29)$$

$$i_{w2r} = A\sin\left(\theta + \xi - \frac{4\pi}{3}\right) - i_e/3 \qquad (30)$$

$$\begin{pmatrix} \begin{pmatrix} T(\theta) & \begin{pmatrix} 0 \\ 0 \end{pmatrix} \end{pmatrix} & \begin{pmatrix} T(\theta+\xi) & \begin{pmatrix} 0 \\ 0 \end{pmatrix} \end{pmatrix} \\ \begin{pmatrix} \begin{pmatrix} 0 & 0 \\ 0 & 0 \end{pmatrix} & \begin{pmatrix} \sqrt{3} \\ 0 \end{pmatrix} \end{pmatrix} & \begin{pmatrix} \begin{pmatrix} 0 & 0 \\ 0 & 0 \end{pmatrix} & \begin{pmatrix} 0 \\ \sqrt{3} \end{pmatrix} \end{pmatrix} \end{pmatrix} \qquad (31)$$

$$\begin{pmatrix} U & \begin{pmatrix} 0 & 0 & 0 \\ 0 & 0 & 0 \\ 0 & 0 & 0 \end{pmatrix} \\ \begin{pmatrix} 0 & 0 & 0 \\ 0 & 0 & 0 \\ 0 & 0 & 0 \end{pmatrix} & U \end{pmatrix} \begin{pmatrix} i_{u1r} \\ i_{v1r} \\ i_{w1r} \\ i_{u2r} \\ i_{v2r} \\ i_{w2r} \end{pmatrix} = \begin{pmatrix} i_d \\ i_q \\ i_e \\ -i_e \end{pmatrix}$$

When A=1(A), ie=3(A), ξ=30°, the relations shown in FIG. 20 hold true. From these, it can be seen that also in the case where the phase difference between coils is considered, there are relations similar to FIG. 19.

Description of 2Y DC Variable Type Inverter of Embodiment

The embodiment of FIG. 17 suppresses the maximum values of phase currents while preventing generation of ripples in a zero-phase current.

That is, the configuration of the preferred embodiment suppresses the maximum amplitudes by adding a predetermined function to phase currents iu1, iv1, iw1 in the 2Y DC variable type inverter of FIG. 13. Then, the maximum amplitudes of electric currents is supressed without changing the output torque of a motor by subtracting the added function from the phase currents iu2, iv2, iw2. Moreover, ripples in the zero-phase current are prevented.

For decreasing current amplitudes without changing the largeness of the motor output torque and the zero-phase current, it is necessary that the phase currents iu1, iv1, iw1, iu2, iv2, iw2 satisfy the relation expressed in formula (21). That is the phase currents must satisfy the following formula (32). This formula indicates that summation of the electric currents of the corresponding phases of each star connection results in a sine wave, and that the sum total of the current of each phase in each star connection is equal to the value of the zero-phase current or the value of the zero-phase current having the opposite sign.

$$\begin{pmatrix} 1 & 0 & 0 & 1 & 0 & 0 \\ 0 & 1 & 0 & 0 & 1 & 0 \\ 0 & 0 & 1 & 0 & 0 & 1 \\ 1 & 1 & 1 & 0 & 0 & 0 \\ 0 & 0 & 0 & 1 & 1 & 1 \end{pmatrix} \begin{pmatrix} i_{u1} \\ i_{v1} \\ i_{w1} \\ i_{u2} \\ i_{v2} \\ i_{w2} \end{pmatrix} = \begin{pmatrix} 2A\sin(\theta) \\ 2A\sin\left(\theta - \frac{2\pi}{3}\right) \\ 2A\sin\left(\theta - \frac{4\pi}{3}\right) \\ i_e \\ -i_e \end{pmatrix} \qquad (32)$$

Because the rank of the matrix on the left side in the formula (32) is 4, by the introducing two free parameters fu(θ), fv(θ), the formulae (25)–(30) can be rewritten as the following sufficient conditions.

$$i_{u1} = A\sin(\theta) + i_e/3 + f_u(\theta) \qquad (33)$$

$$i_{v1} = A\sin\left(\theta - \frac{2\pi}{3}\right) + i_e/3 + f_v(\theta) \qquad (34)$$

$$i_{w1} = A\sin\left(\theta - \frac{4\pi}{3}\right) + i_e/3 + f_w(\theta) \qquad (35)$$

$$i_{u2} = A\sin(\theta) - i_e/3 - f_u(\theta) \qquad (36)$$

$$i_{v2} = A\sin\left(\theta - \frac{2\pi}{3}\right) - i_e/3 - f_v(\theta) \qquad (37)$$

$$i_{w2} = A\sin\left(\theta - \frac{4\pi}{3}\right) - i_e/3 - f_w(\theta) \qquad (38)$$

$$f_u(\theta) + f_v(\theta) + f_w(\theta) = 0 \qquad (39)$$

$$\int_0^{2\pi} f_u(\theta)d\theta = 0 \qquad (40)$$

$$\int_0^{2\pi} f_v(\theta)d\theta = 0 \qquad (41)$$

$$\int_0^{2\pi} f_w(\theta)d\theta = 0 \qquad (42)$$

Here, fu(θ), fv(θ), fw(θ) are parameters with 2 degrees of freedom and capable of being utilized for design purposes.

Accordingly, by establishing parameters fu(θ), fv(θ), fw(θ) that meet the formulae (33)–(42), phase currents iu1, iv1, iw1, iu2, iv2, iw2 can be changed without the changes of the output torque and the zero-phase current. Then, by selection of parameters fu(θ), fv(θ), fw(θ) so as to decrease the maximum amplitudes of the phase currents iu1, iv1, iw1, iu2, iv2, iw2, the desired results can be achieved.

The example of FIG. 18 relaxes the conditions in order to permit the generation of ripples in the zero-phase current and thereby suppress the maximum values of phase currents. In this case, the condition of the formula (39) can be removed, which further widens the degree of freedom for selection of the parameters fu(θ), fv(θ), fw(θ), which in turn enables further restraint the maximum values of the phase currents.

Moreover, while in the above it is assumed that there is no phase difference between the two motor coils M1, M2, there are many actual cases where the coils are disposed with a phase difference between them. In such cases, the influences of the existing phase difference can be eliminated by the formation of a phase difference corresponding to coil currents.

In a case where a phase difference ξ exists between each coil of a star connection, the formula (31) replaces formula (21). That is, for the decrease of current amplitudes without the change of the largeness of motor generation torque and the zero-phase current, it is necessary for the phase currents u1, iv1, iw1, iu2, iv2, iw2 to satisfy a formula (43). This formula shows that the summation of the corresponding d–q axis current of each star connection is constant, and that the sum total of each phase current in each star connection is equal to the value of the zero-phase current or the value of the zero-phase current or the value of the zero-phase current having an opposite sign.

$$\begin{pmatrix} T(\theta) & \begin{pmatrix} 0 \\ 0 \end{pmatrix} & T(\theta+\xi) & \begin{pmatrix} 0 \\ 0 \end{pmatrix} \\ \begin{pmatrix} 0 & 0 \\ 0 & 0 \end{pmatrix} & \begin{pmatrix} \sqrt{3} \\ 0 \end{pmatrix} & \begin{pmatrix} 0 & 0 \\ 0 & 0 \end{pmatrix} & \begin{pmatrix} 0 \\ \sqrt{3} \end{pmatrix} \end{pmatrix} \quad (43)$$

$$\begin{pmatrix} U & \begin{pmatrix} 0 & 0 & 0 \\ 0 & 0 & 0 \\ 0 & 0 & 0 \end{pmatrix} \\ \begin{pmatrix} 0 & 0 & 0 \\ 0 & 0 & 0 \\ 0 & 0 & 0 \end{pmatrix} & U \end{pmatrix} \begin{pmatrix} i_{u1r} \\ i_{v1r} \\ i_{w1r} \\ i_{u2r} \\ i_{v2r} \\ i_{w2r} \end{pmatrix} = \begin{pmatrix} i_d \\ i_q \\ i_e \\ -i_e \end{pmatrix}$$

Here, as one solution satisfying the formula (43), the following results can similarly be obtained in the case described above.

$$i_{u1} = A\sin(\theta) + i_e/3 + f_u(\theta) \quad (44)$$

$$i_{v1} = A\sin\left(\theta - \frac{2\pi}{3}\right) + i_e/3 + f_v(\theta) \quad (45)$$

$$i_{w1} = A\sin\left(\theta - \frac{4\pi}{3}\right) + i_e/3 + f_w(\theta) \quad (46)$$

$$i_{u2} = A\sin(\theta + \xi) - i_e/3 + h_u(\theta) \quad (47)$$

$$i_{v2} = A\sin\left(\theta + \xi - \frac{2\pi}{3}\right) - i_e/3 + h_v(\theta) \quad (48)$$

$$i_{w2} = A\sin\left(\theta + \xi - \frac{4\pi}{3}\right) - i_e/3 + h_w(\theta) \quad (49)$$

$$f_u(\theta) + f_v(\theta) + f_w(\theta) = 0 \quad (50)$$

$$h_u(\theta) + h_v(\theta) + h_w(\theta) = 0 \quad (51)$$

$$\int_0^{2\pi} f_u(\theta) d\theta = 0 \quad (52)$$

$$\int_0^{2\pi} f_v(\theta) d\theta = 0 \quad (53)$$

$$\int_0^{2\pi} f_w(\theta) d\theta = 0 \quad (54)$$

$$\int_0^{2\pi} h_u(\theta) d\theta = 0 \quad (55)$$

$$\int_0^{2\pi} h_v(\theta) d\theta = 0 \quad (56)$$

$$\int_0^{2\pi} h_w(\theta) d\theta = 0 \quad (57)$$

$$V \begin{pmatrix} f_u(\theta) \\ f_v(\theta) \\ f_w(\theta) \end{pmatrix} = -T(\xi) V \begin{pmatrix} h_u(\theta) \\ h_v(\theta) \\ h_w(\theta) \end{pmatrix} \quad (58)$$

$$V = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \quad (59)$$

Here, parameters $f_u(\theta)$, $f_v(\theta)$, $f_w(\theta)$), $h_u(\theta)$, $h_v(\theta)$, $h_w(\theta)$ can be used as design parameters. moreover, when $\xi=0°$, the functions of the formulae (33), (42) satisfy the formulae (44), (59).

Then, by giving the parameters $f_u(\theta)$, $f_v(\theta)$, $f_w(\theta)$, $h_u(\theta)$, $h_v(\theta)$, hw ($\theta$), the phase currents iu1, iv1, iw1, iu2, iv2, iw2 can be changed without altering the output torque and the zero-phase current. Moreover, by setting the parameters fu($\theta$), fv($\theta$), fw($\theta$), hu($\theta$), hv($\theta$), hw($\theta$) to suppress the maximum values of the phase currents iu1, iv1, iw1, iu2, iv2, iw2, additional desired results can be achieved.

Moreover, by relaxing conditions to permit the zero-phase current to include ripple currents, the condition $$fu(\theta)+fv(\theta)+fw(\theta)+Hu(\theta)+Hv(\theta)+Hw(\theta)=0$$

can replace the conditions of the formulae (50), (51).

Concrete Examples of not Permitting Ripples in Zero-Phase Current

A conducting method meeting the aforesaid conditions when the phase difference between coils $\xi$ is 0 degrees can be obtained by the setting of the parameters fu($\theta$), fv($\theta$), fw($\theta$) to formulae (60)–(62), wherein g1 in the formulae is a constant inserted to satisfy formulae (40)–(42). In this example, g1=0.867.

$$f_u(\theta) = \begin{cases} -0.5A\left(\sin\left(\theta + \frac{2\pi}{6}\right) - g_1\right) & \left(0 \le \theta \le \frac{2\pi}{6}\right) \\ A(\sin(\theta) - g_1) & \left(\frac{2\pi}{6} \le \theta \le 2\frac{2\pi}{6}\right) \\ -0.5A\left(\sin\left(\theta - \frac{2\pi}{6}\right) - g_1\right) & \left(2\frac{2\pi}{6} \le \theta \le 3\frac{2\pi}{6}\right) \\ -0.5A\left(\sin\left(\theta - 2\frac{2\pi}{6}\right) - g_1\right) & \left(3\frac{2\pi}{6} \le \theta \le 4\frac{2\pi}{6}\right) \\ A\left(\sin\left(\theta - 3\frac{2\pi}{6}\right) - g_1\right) & \left(4\frac{2\pi}{6} \le \theta \le 5\frac{2\pi}{6}\right) \\ -0.5A\left(\sin\left(\theta - 4\frac{2\pi}{6}\right) - g_1\right) & \left(5\frac{2\pi}{6} \le \theta \le 6\frac{2\pi}{6}\right) \end{cases} \quad (60)$$

$$f_v(\theta) = \begin{cases} A\left(\sin\left(\theta + \frac{2\pi}{6}\right) - g_1\right) & \left(0 \le \theta \le \frac{2\pi}{6}\right) \\ -0.5A(\sin(\theta) - g_1) & \left(\frac{2\pi}{6} \le \theta \le 2\frac{2\pi}{6}\right) \\ -0.5A\left(\sin\left(\theta - \frac{2\pi}{6}\right) - g_1\right) & \left(2\frac{2\pi}{6} \le \theta \le 3\frac{2\pi}{6}\right) \\ A\left(\sin\left(\theta - 2\frac{2\pi}{6}\right) - g_1\right) & \left(3\frac{2\pi}{6} \le \theta \le 4\frac{2\pi}{6}\right) \\ -0.5A\left(\sin\left(\theta - 3\frac{2\pi}{6}\right) - g_1\right) & \left(4\frac{2\pi}{6} \le \theta \le 5\frac{2\pi}{6}\right) \\ -0.5A\left(\sin\left(\theta - 4\frac{2\pi}{6}\right) - g_1\right) & \left(5\frac{2\pi}{6} \le \theta \le 6\frac{2\pi}{6}\right) \end{cases} \quad (61)$$

$$f_w(\theta) = \begin{cases} -0.5A\left(\sin\left(\theta + \frac{2\pi}{6}\right) - g_1\right) & \left(0 \le \theta \le \frac{2\pi}{6}\right) \\ -0.5A(\sin(\theta) - g_1) & \left(\frac{2\pi}{6} \le \theta \le 2\frac{2\pi}{6}\right) \\ A\left(\sin\left(\theta - \frac{2\pi}{6}\right) - g_1\right) & \left(2\frac{2\pi}{6} \le \theta \le 3\frac{2\pi}{6}\right) \\ -0.5A\left(\sin\left(\theta - 2\frac{2\pi}{6}\right) - g_1\right) & \left(3\frac{2\pi}{6} \le \theta \le 4\frac{2\pi}{6}\right) \\ -0.5A\left(\sin\left(\theta - 3\frac{2\pi}{6}\right) - g_1\right) & \left(4\frac{2\pi}{6} \le \theta \le 5\frac{2\pi}{6}\right) \\ A\left(\sin\left(\theta - 4\frac{2\pi}{6}\right) - g_1\right) & \left(5\frac{2\pi}{6} \le \theta \le 6\frac{2\pi}{6}\right) \end{cases} \quad (62)$$

Figure 21A:
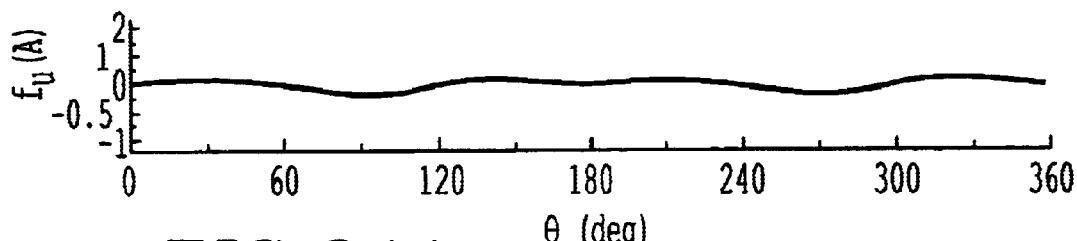
FIG. 21 is a diagram showing a phase current and a function f in an example wherein ripple currents are suppressed.
Figure 21B:
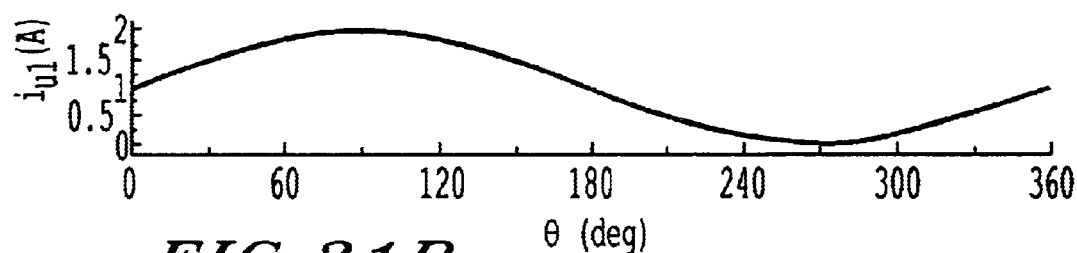
Figure 22A:
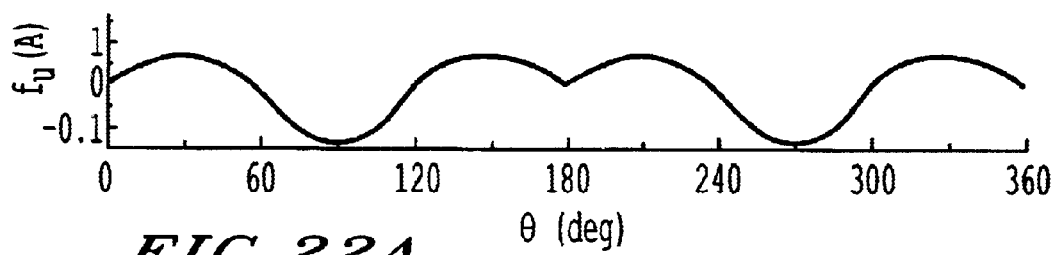
FIG. 22 is an enlarged diagram of FIG. 21.
Figure 22B:
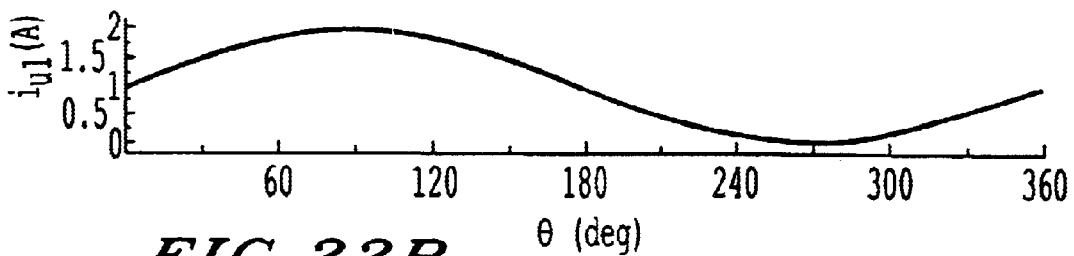
Figure 23A:
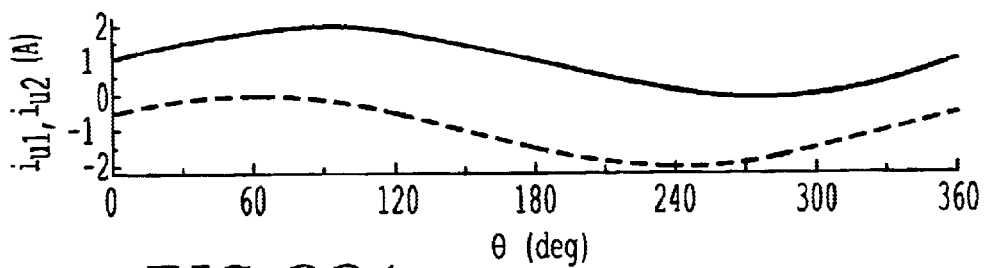
FIG. 23 is a diagram showing phase currents in an example wherein the ripple currents are suppressed.
Figure 23B:
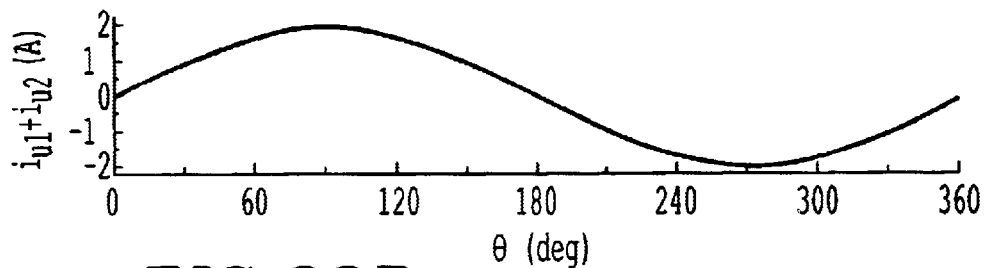
Figure 23C:
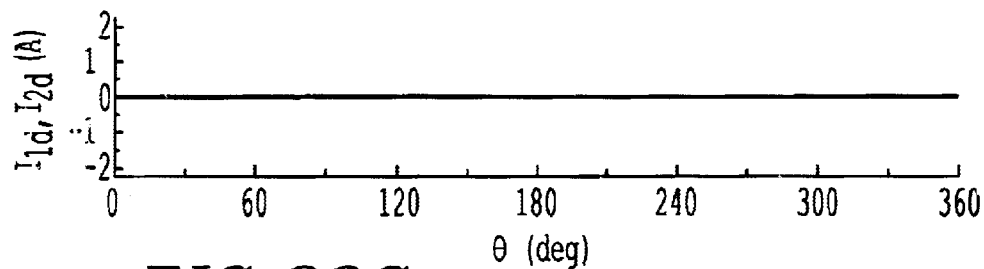
Figure 23D:
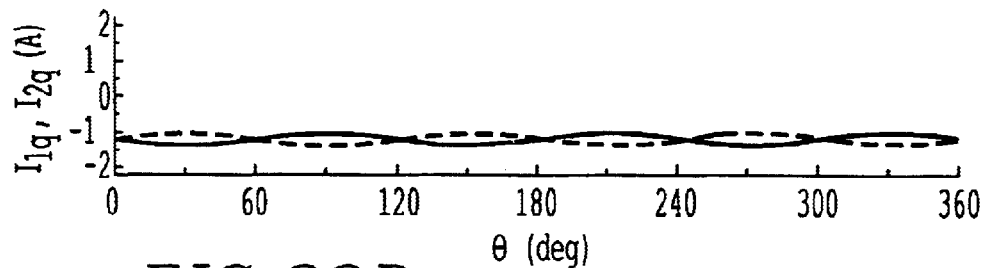
Figure 23E:
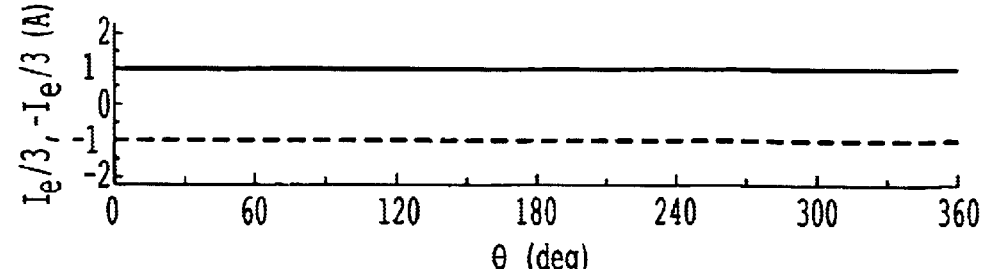

The waveform of the parameter fu($\theta$) in case of A=1(A), ie=3(A) is shown in FIG. 21 and FIG. 22 in comparison with the wave form of the current iu1. In FIG. 21, the scales of the ordinate axes of the diagram of the parameter fu($\theta$) and the diagram of the current iu1 a reset equal. In FIG. 22, the wave form of the parameter fu($\theta$) is enlarged for ease of viewing. As shown in the figures, the waveform of the parameter fu(θ) takes a form such that peak portions of a sine wave are cut for widths of 60 degrees to be arranged in the order of the positive side, negative side, and positive side, and such that the negative amplitude is set to be twice the positive amplitude. That is, the waveform is one such that the maximum peaks of the current iu1 are mostly suppressed.

Consequently, by addition of parameters fu(θ), fv(θ), fw(θ) producing a sine curve, the maximum currents of the phase currents can be suppressed without any change in output torque. Moreover, this example also satisfies the condition that the zero-phase current is not generated.

Moreover, results from application of the formulae (60)–(62) are shown in FIG. 23. From this figure, the following can be known.

Zero-Phase Current

The zero-phase current ie is 3(A), and the current includes no ripple components.

Torque

The current (iu1+iu2) for generating motor torque is the same as that shown in FIG. 19, and the current generates the intended torque.

Size of Phase Currents

The maximum value of the phase currents is 1.866(A). The breakdown of the size is that the alternating-current component is 0.866A and the direct-current component is 1A.

As described above, by use of the parameters fu(θ), fv(θ), fw(θ) expressed in the formulae (60)–(62), the maximum values of the phase currents can be suppressed without any influence on the motor output torque.

Moreover, as another example in which no ripples are permitted in the zero-phase current when the angle ξ is 0 degrees, a case where an alternating current is modulated with a third order higher harmonic wave is shown.

Figure 24A:
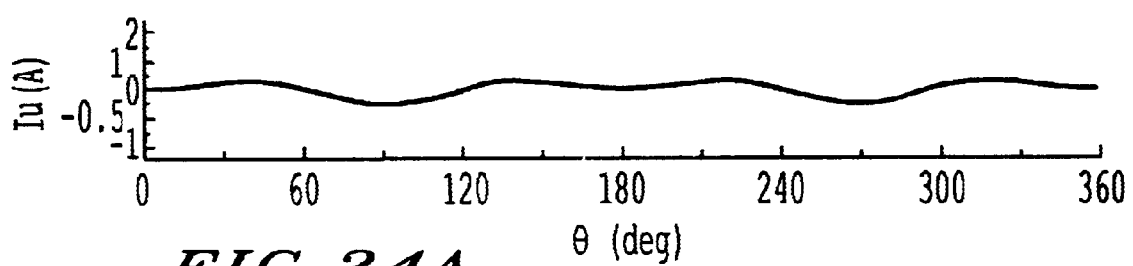
FIG. 24 is a diagram showing a phase current and the maximum values of the amplitudes thereof when alternating current amplitudes are modulated by a three-times higher harmonic wave.
Figure 24B:
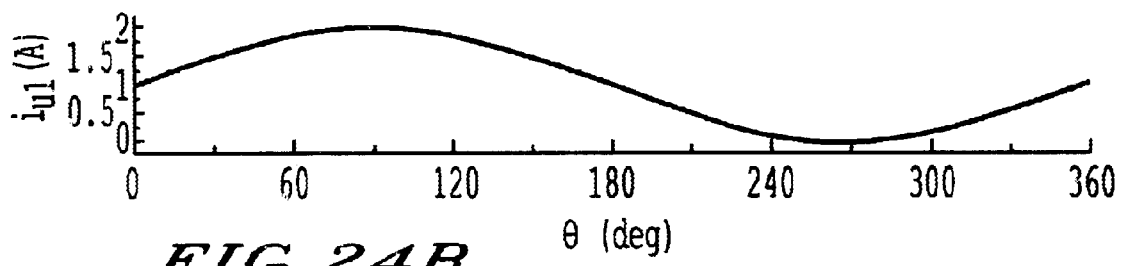
Figure 25A:
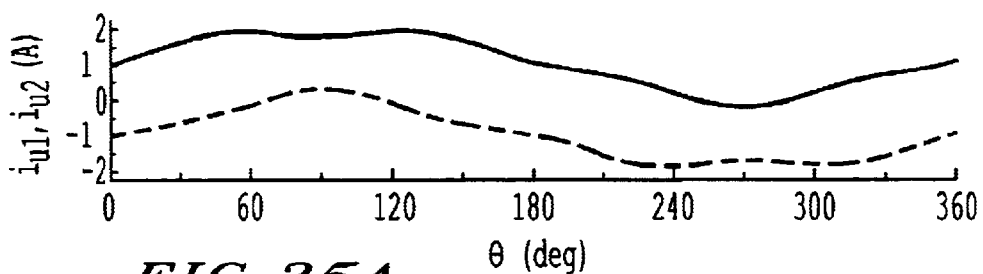
FIG. 25 is a diagram showing phase currents in an example wherein alternating current amplitudes are modulated by a harmonic wave of triple frequency.
Figure 25B:
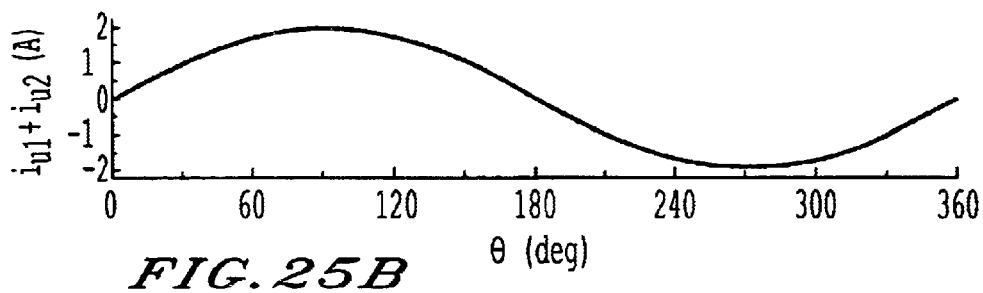
Figure 25C:
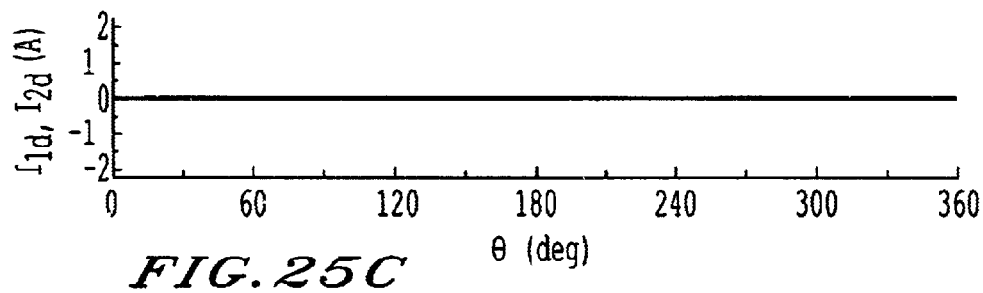
Figure 25D:
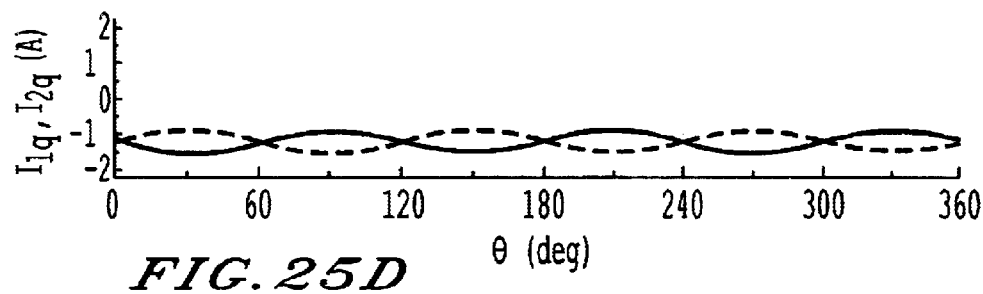
Figure 25E:
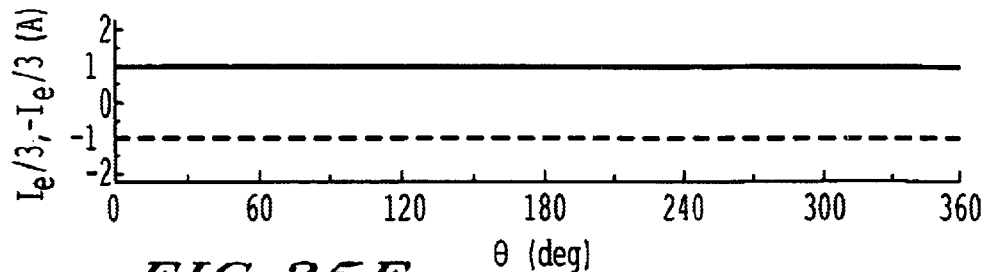
Figure 26A:
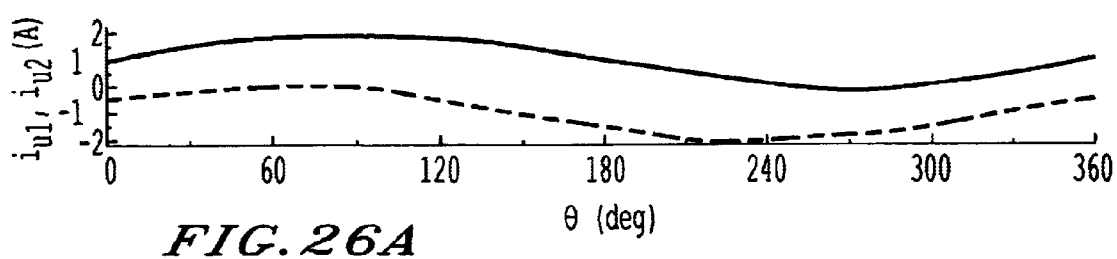
FIG. 26 is a diagram showing phase currents and the like in an example wherein there are phase differences and ripples are suppressed.
Figure 26B:
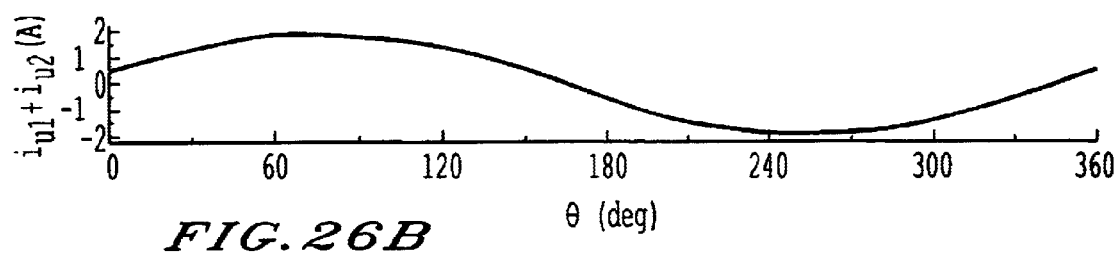
Figure 26C:
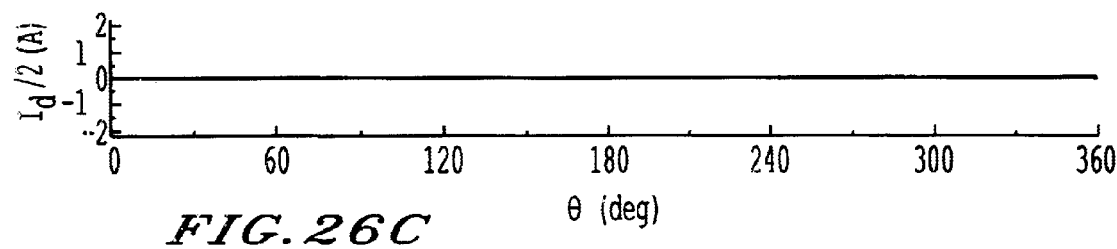
Figure 26D:
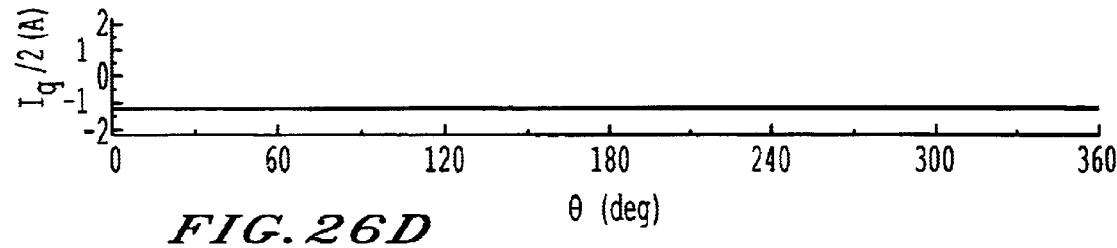
Figure 26E:
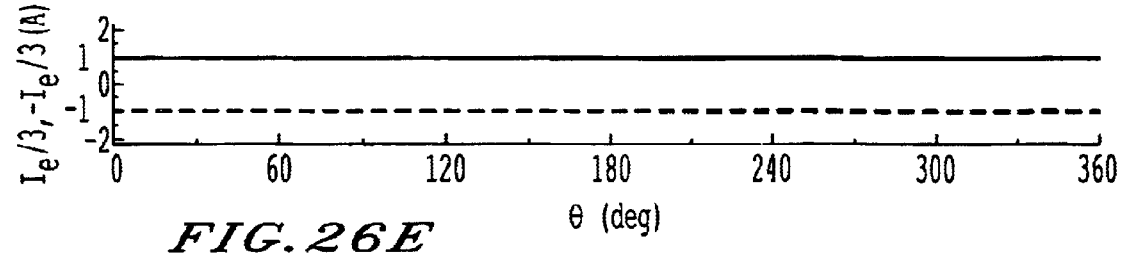

That is, the waveform of the parameter fu(θ) in the case where the alternating-current amplitude A is 1(A) and the zero-phase current ie is 3(A) is shown in FIG. 24 in comparison with the waveform of the u-phase current iu1. The waveform is a sine wave having the amplitude of the original alternating-current waveform and a frequency three-times that of the original waveform. The waveform is modulated as expressed by the following formulae.

$$i_{u1} = (1 + K \sin(3\theta)) A \sin(\theta) + i_e/3 \quad (63)$$

$$i_{u2} = (1 - K \sin(3\theta)) A \sin(\theta) - i_e/3 \quad (64)$$

Moreover, the formulae (63), (64) can be arranged as follows.

$$i_{u1} = A \sin(\theta) + i_e/3 + K \sin(3\theta) A \sin(\theta) \quad (65)$$

$$i_{u2} = A \sin(\theta) - i_e/3 - K \sin(3\theta) A \sin(\theta) \quad (66)$$

Hereupon, when the parameter fu(θ) is set to be equal to K sin(3θ)A sin(θ), the conditions of formulae (33)–(42) are satisfied. That is, by the setting of the parameter fu(θ) to be K sin(3θ)A sin(θ), the following results can be obtained.

FIG. 24 shows the parameter fu(θ). Moreover, the results of the usage of the parameter fu(θ) are shown in FIG. 25. From the figure, the following can be known.

Zero-Phase Current

The average value of the zero-phase current ie is 3(A). The amplitude thereof is three times that of the added parameter fu(θ).

Torque

The current (iu1+iu2) that generates motor torque is the same as that shown in FIG. 19, and the intended torque is generated.

Size of Phase Currents

The maximum value of the phase currents is 1.872(A), wherein the alternating-current component is 0.872A and the direct-current component is 1A.

Next, the results in an example wherein a phase difference of 30 degrees (ξ30°) exists in the coil position of each star connection are shown in FIG. 26. From the figure, the following can be known.

Zero-Phase Current

The zero-phase current ie is 3(A), and does not include any ripple component.

Torque

The currents (id and iq) for generating motor torque are the same as those shown in FIG. 19, and the intended torque is generated.

Size of Phase Currents

The maximum value of the phase currents is 1.866(A), wherein the alternating-current component is 0.866A and the direct-current component is 1A.

Waveform of Phase Current

The command value used in this example has a steeply changing waveform for suppressing the size of electric currents. However, in actual practice, the waveform is realized by the filtering of the command value to remove the high frequency components. In such a case, the effect of suppressing electric currents deteriorates slightly.

Concrete Examples of Permitting Ripples in Zero-Phase Current

One method for suppressing the size of phase currents while ¥ permitting a zero-phase current ripple when the phase difference between coils ξ is 0 degrees is to determine the parameters fu(θ), fv(θ), fw(θ) as in formulae (67)–(69). Here, g2 is a constant inserted to satisfy the conditions of the formulae (40)–(42); g2=−0.637 in this example.

$$f_u(\theta) = \begin{cases} -A\sin(\theta) - g_2 & (0 \le \theta \le \pi) \\ A\sin(\theta) - g_2 & (\pi \le \theta \le 2\pi) \end{cases} \quad (67)$$

$$f_v(\theta) = \begin{cases} A\sin\left(\theta - \frac{2\pi}{3}\right) - g_2 & \left(0 \le \theta \le 2\frac{2\pi}{6}\right) \\ -A\sin\left(\theta - \frac{2\pi}{3}\right) - g_2 & \left(2\frac{2\pi}{6} \le \theta \le 5\frac{2\pi}{6}\right) \\ A\sin\left(\theta - \frac{2\pi}{3}\right) - g_2 & \left(5\frac{2\pi}{6} \le \theta \le 2\pi\right) \end{cases} \quad (68)$$

$$f_w(\theta) = \begin{cases} -A\sin\left(\theta - \frac{4\pi}{3}\right) - g_2 & \left(0 \le \theta \le \frac{\pi}{6}\right) \\ A\sin\left(\theta - \frac{4\pi}{3}\right) - g_2 & \left(\frac{2\pi}{6} \le \theta \le 4\frac{2\pi}{6}\right) \\ -A\sin\left(\theta - \frac{4\pi}{3}\right) - g_2 & \left(4\frac{2\pi}{6} \le \theta \le 2\pi\right) \end{cases} \quad (69)$$

Figure 27A:
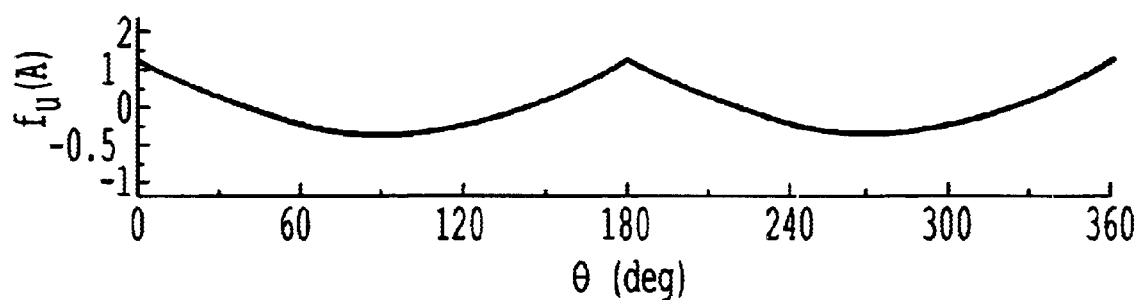
FIG. 27 is a diagram showing a phase current and the function f in an example wherein a ripple current is admissible.
Figure 27B:
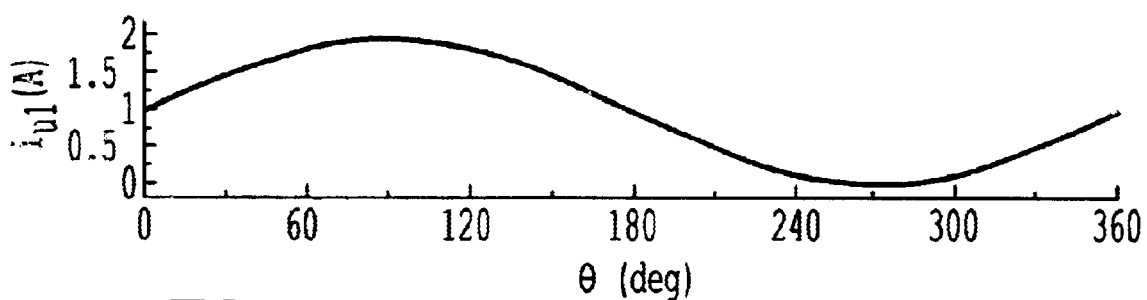
Figure 28A:
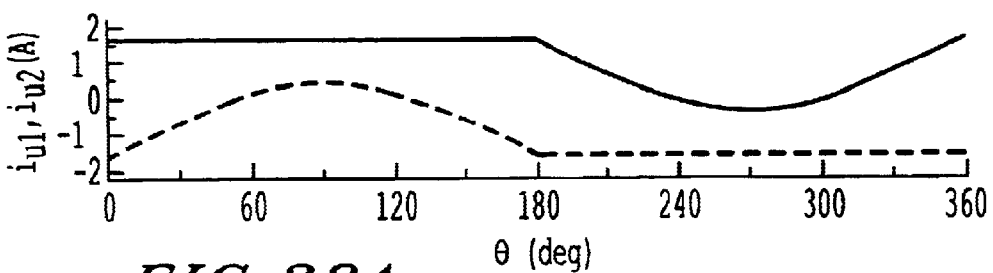
FIG. 28 is a diagram showing phase currents in an example wherein a ripple current is admissible.
Figure 28B:
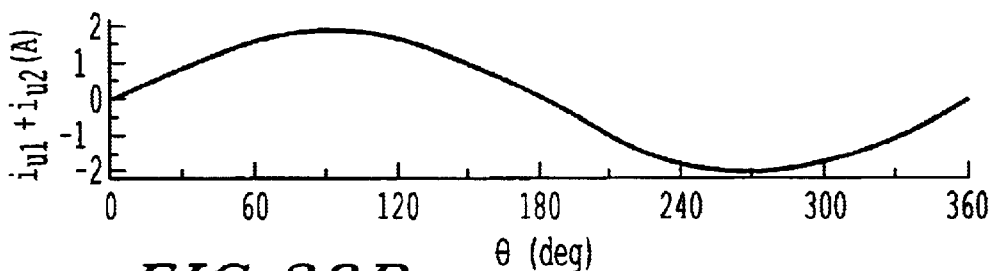
Figure 28C:
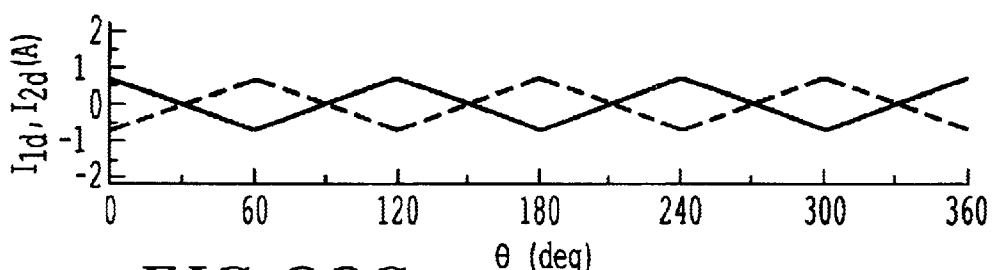
Figure 28D:
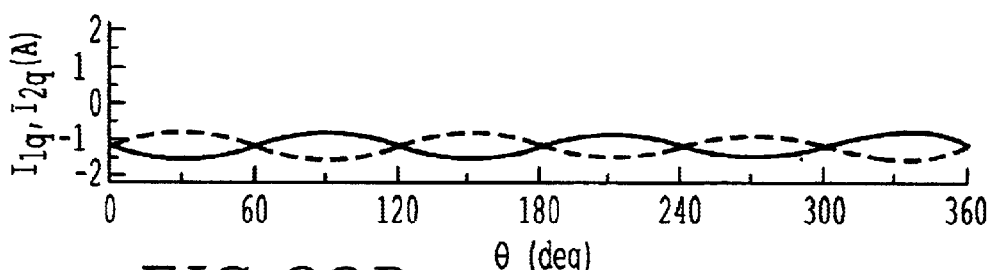
Figure 28E:
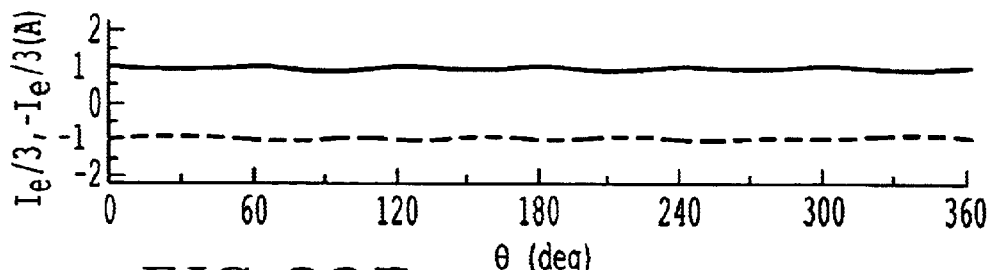

The waveform of the parameter fu(θ) when the alternating-current amplitude A is 1(A) and the zero-phase current ie is 3(A) is shown in FIG. 27 in comparison with the waveform of the u-phase current iu1. Moreover, results when the formulae (67)–(69) a re applied are shown in FIG. 28. From the figures, the following can be known.

Zero-Phase Current

The average value of the zero-phase current ie is 3(A) This current includes a 0.46A ripple component.

Torque

The current (iu1+iu2) for generating motor torque is the same as that shown in FIG. 19, and the current generates the intended torque.

Size of Phase Currents

The maximum value of the phase currents is 1.63(A), wherein the alternating-current component is 0.63A and the direct-current component is 1A.

Figure 29A:
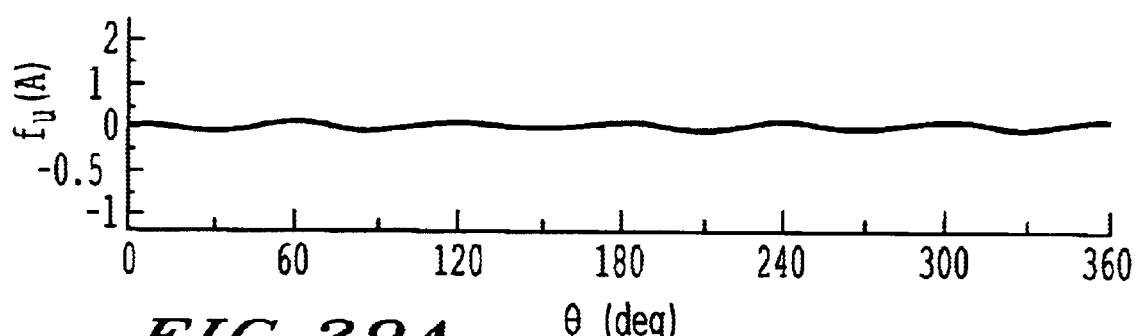
FIG. 29 is a diagram showing a phase current and the maximum values of amplitudes thereof in an example of modulation using a harmonic wave having an frequency six times that of the base wave.
Figure 29B:
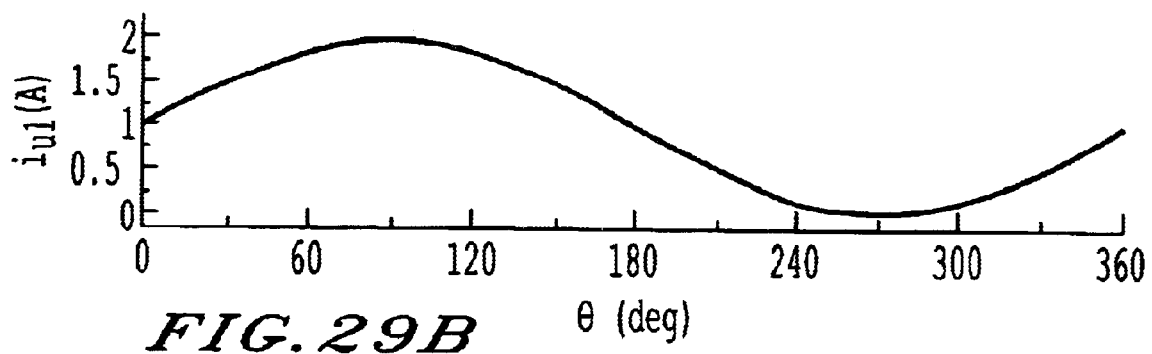
Figure 30A:
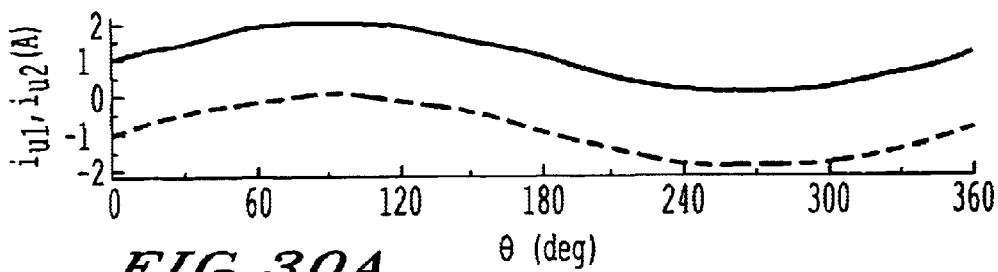
FIG. 30 is a diagram showing phase currents in an example of modulation using a harmonic wave having an frequency six times that of the base wave.
Figure 30B:
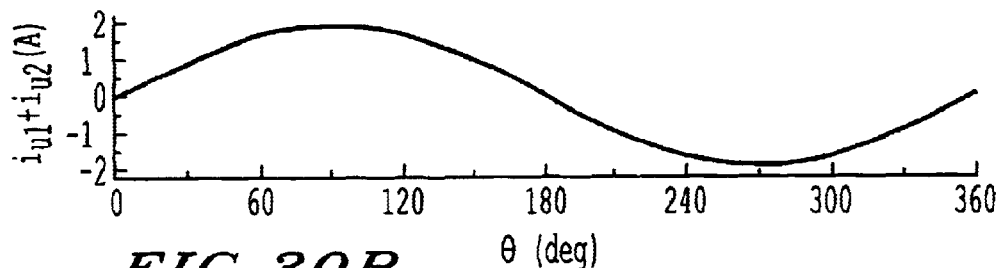
Figure 30C:
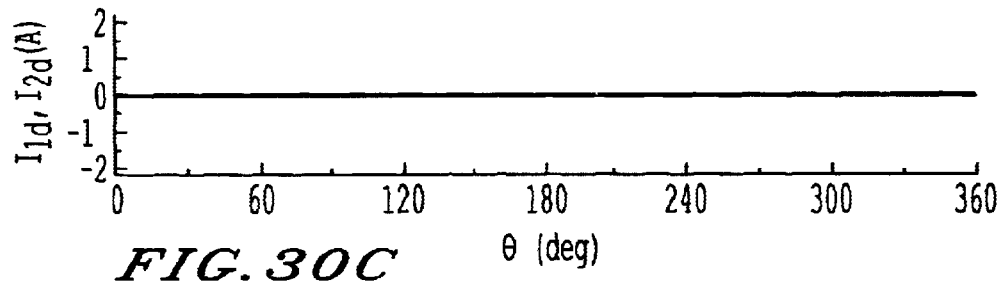
Figure 30D:
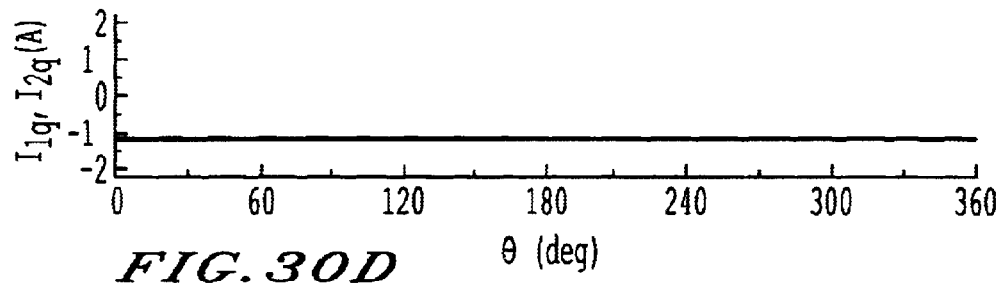
Figure 30E:
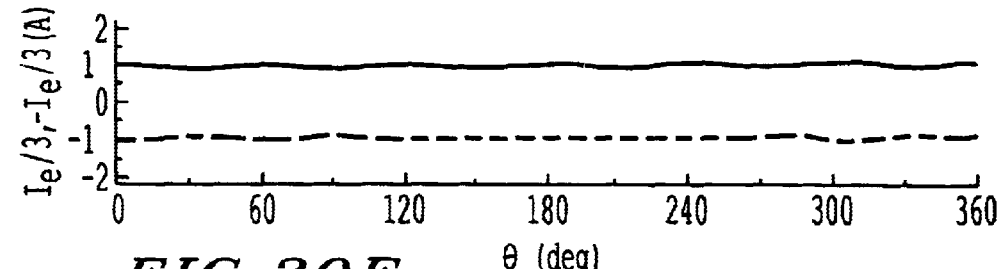

Next, as another example in which ripples are permitted in the zero-phase current when the angle ξ is 0 degrees, an example wherein a six-order higher harmonic wave is added is shown. The waveform of the parameter fu(θ) when the alternating-current amplitude A is 1 (A) and the zero-phase current ie is 3(A) is shown in FIG. 29 in comparison with the waveform of the u-phase current iu1. A value optimized to make the phase currents minimum is used as the amplitude of the higher harmonic wave.

The results of application of the parameter fu(θ) are shown in FIG. 30. From the figure, the following can be known.

Zero-Phase Current

The average value of the zero-phase current ie is 3(A), which includes ripple components. The size of the ripple components is three times as large as that of the added parameter fu(θ).

Torque

The current (iu1+iu2) that generates motor torque is the same as one shown in FIG. 19, and the intended torque is generated.

Size of Phase Currents

The maximum value of the phase currents is 1.96(A), wherein the alternating-current component is 0.96A and the direct-current component is 1A.

As described above, according to the present invention, the maximum current value of phase currents can be suppressed without increasing or decreasing torque, and the current capacity of a device can be decreased without affecting the performance of the motor. Consequently, cost of the system can be reduced while performance is maintained. Moreover, by suppressing torque ripples, the functions of a motor can be maintain as a sufficient level.

Furthermore, high frequency components must be superimposed on a current to suppressing the current. Consequently, it becomes necessary to control the current up to a high frequency region. However, by the switching of control based on the number of rotations, more effective control becomes possible.

That is, because the suppression of the amplitude maximum value is performed in a low rotation area where current values are large, control is simple even when-a higher order harmonic wave is superimposed. On the other hand, because a conventional method is used in the high rotation area, the control problems experienced in the related art when a higher frequency component is super imposed are avoided. Moreover, in a middle rotation region, appropriate control can be performed by suppressing the ripples of a zero-phase current.

By the switching of control as described above, current can be suppressed while avoiding the various problems caused which result from control based on current suppression.

Although the embodiment of the invention has been described on the basis of examples, the invention is not limited to the examples, and the invention can be implemented in various forms without departing from the scope and the sprit thereof.

What is claimed is:

1. A driving apparatus comprising:
   a plurality of polyphase alternating current loads including a winding group;
   an inverter circuit connected with one of said plural polyphase alternating current loads;
   at least one secondary power supply connected between neutral points of a winding group of the polyphase alternating current load to which said inverter circuit is connected and at least one winding group of a polyphase alternating current load different from said polyphase alternating current load; and
   at least one neutral point electric potential control apparatus for controlling electric potential at a neutral point of a winding group included in a polyphase alternating current load to which said inverter circuit is not connected among said polyphase alternating current loads to which said secondary power supply is connected.

2. The driving apparatus according to claim 1, wherein said neutral point electric potential control apparatus comprises an inverter circuit connected to the polyphase alternating current load to be controlled.

3. The driving apparatus according to claim 1, wherein said plural polyphase alternating current loads are loads equipped to a single electrical apparatus.

4. A power output apparatus capable of outputting power, said apparatus comprising:
   two star connection coils;
   two inverter circuits having a positive pole bus and a negative pole bus for common use, said inverter circuits being capable of supplying polyphase alternating current power to at least each of said two star connection coils;
   a first power supply connected with said positive pole bus and said negative pole bus; and
   a second power supply connected between neutral points of said two star connection coils,
   wherein said power output apparatus outputs power by flowing an electric current through said two star connection coils.

5. The power output apparatus according to claim 4, wherein said first power supply is a storage device capable of charging and discharging.

6. The power output apparatus according to claim 5, wherein said two inverter circuits severally include a plural series connections of upper side switching devices and lower side switching devices, both devices being disposed between said positive pole bus and said negative pole bus, and connection points of said upper side switching devices and said lower side switching devices are severally connected with a plurality of terminals of corresponding star connection coils, and said power output apparatus controls a voltage of said first power supply by controlling percentage modulations being ratios of on-periods of said upper side switching devices and said lower side switching devices in said two inverter circuits.

7. The power output apparatus according to claim 6, wherein said power output apparatus severally controls the percentage modulations in said two inverters according to the formula $$Vc=Vb/(d1-d2),$$

wherein d1 designates a percentage modulation of one of said two inverters;

d2 designates a percentage modulation of the other of said two inverters;

Vb designates an output voltage of said second power supply; and

Vc designates an output voltage of said first power supply.

8. The power output apparatus according to claim 7, wherein said formula for control is modified in consideration of a dead time during which all switching devices in the plural series connections of the upper side switching devices and the lower side switching devices in said two inverters are being turned off in a case where the dead time is set.

9. The power output apparatus according to claim 8, wherein said modified formula is $$Vc=Vb/\{(d1-Td/Ts)-(d2+Td/Ts)\},$$

wherein Ts designates a period of a carrier wave to determine on- and off-periods in said two inverters, and Td designates said dead time in one period of the carrier wave.

10. The power output apparatus according to claim 4, wherein said two star connection coils are provided correspondingly to one rotor to constitute one electric motor.

11. The power output apparatus according to claim 10, wherein said apparatus performs switching control of a plurality of switching devices of said two inverter circuits such that a phase difference between each polyphase alternating current power to be supplied to said two star connection coils of said electric motor is equal to a phase difference of said two star connection coils, a desired torque is output from said electric motor, and a voltage of said first power supply is maintained at an object voltage.

12. The power output apparatus according to claim 4, wherein said two star connection coils are provided correspondingly to separated rotors to constitute two separated electric motors.

13. The power output apparatus according to claim 12, wherein said apparatus performs switching control of a plurality of switching devices of each of said two inverter circuits such that a desired torque is output from each of said two electric motors while a voltage of said first power supply is maintained at an object voltage.

14. The power output apparatus according to claim 10, wherein said apparatus decreases an amplitude maximum value of the electric current to be supplied to one of said star connection coils and adds an electric current corresponding to an amount of the decreased amplitude maximum value to the electric current to be supplied to another of said star connection coils.

15. The power output apparatus according to claim 14, wherein said apparatus determines the amount of the decreased amplitude maximum value and the adding of the electric current such that a condition that output torque of said electric motor does not change is satisfied.

16. The power output apparatus according to claim 15, wherein said apparatus determines the amount of the decreased amplitude maximum value and the adding of the electric current such that a condition that an influence to an electric current flowing between said neutral points of said two star connection coils is not generated is satisfied.

17. A method for controlling a power output apparatus including an electric motor having two star connection coils;

two inverter circuits having a positive pole bus and a negative pole bus for common use, said inverter circuits being capable of supplying polyphase alternating current power to each of said two star connection coils;

a storage device connected between said positive pole bus and said negative pole bus; and a power supply connected between neutral points of said two star connection coils of said electric motor, said method comprising a step of:

performing switching control of a plurality of switching devices of said two inverter circuits such that a phase difference between each polyphase alternating current power to be supplied to said two star connection coils of said electric motor is equal to a phase difference between said two star connection coils in a state such that an electric potential difference between said neutral points of said two star connection coils can be adjusted, whereby desired torque is output from said electric motor and an electric potential difference between said positive pole bus and said negative pole bus is made to be a desired electric potential difference.

18. A method for controlling a power output apparatus including a first electric motor having a star connection coil;

a second electric motor having a star connection coil;

a first inverter circuit capable of supplying polyphase alternating current power to said first electric motor;

a second inverter circuit having positive and negative pole buses being positive and negative pole buses of said first inverter circuit, respectively, said second inverter circuit being capable of supplying polyphase alternating current power to said second electric motor;

a storage device connected between said positive and negative pole buses of said first inverter circuit; and a power supply connected between a neutral point of said first electric motor and a neutral point of said second electric motor, said method comprising a step of:

performing switching control of a plurality of switching devices of said first inverter circuit and said second inverter circuit in a state such that an electric potential difference between said neutral point of said first electric motor and said neutral point of said second electric motor can be adjusted, whereby desired torque is output from said first electric motor, desired torque is output from said second electric motor, and an electric potential difference between said positive pole bus and said negative pole bus is made to be a desired electric potential difference.

* * * * *